US012671525B2

(12) United States Patent
Wu

(10) Patent No.: US 12,671,525 B2
(45) Date of Patent: Jun. 30, 2026

(54) METHOD, APPARATUS AND DEVICE FOR FEEDING BACK CODEBOOK, AND STORAGE MEDIUM

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 428 days.

(21) Appl. No.: 18/367,326

(22) Filed: Sep. 12, 2023

(65) Prior Publication Data

US 2024/0007228 A1 Jan. 4, 2024

Related U.S. Application Data

(63) Continuation of application No. PCT/CN2021/093163, filed on May 11, 2021.

(51) Int. Cl.
*H04L 1/1812* (2023.01)
*H04W 72/12* (2023.01)
*H04W 72/20* (2023.01)

(52) U.S. Cl.
CPC .......... *H04L 1/1812* (2013.01); *H04W 72/12* (2013.01); *H04W 72/20* (2023.01)

(58) Field of Classification Search
CPC ... H04L 1/1812; H04L 1/1861; H04L 1/1864; H04L 1/1887; H04L 1/1854; H04L 5/0053; H04L 5/0055; H04W 72/12; H04W 72/20
See application file for complete search history.

(56) References Cited

U.S. PATENT DOCUMENTS

2019/0342041 A1* 11/2019 Medles ................. H04L 5/0092
2021/0050950 A1 2/2021 Zhou
(Continued)

FOREIGN PATENT DOCUMENTS

CN 110149172 A 8/2019
CN 110557233 A 12/2019
(Continued)

OTHER PUBLICATIONS

Samsung: "PDSCH/PUSCH enhancements for NR from 52.6 CHz to 71 GHz", 3GPP Draft; R1-2103233, 3rd Generation Partnership Project (3GPP), Mobile Competence Centre ; 650, Route Des Lucioles ; F-06921 Sophia-Antipolis Cedex; France vol. RAN WG1, No. e-Meeting; Apr. 12, 2021-Apr. 20, 2021, Apr. 7, 2021 (Apr. 7, 2021), XP052178010,the whole document, 12 pages.
(Continued)

*Primary Examiner* — Shawn D Miller
(74) *Attorney, Agent, or Firm* — BAYES PLLC

(57) ABSTRACT

A method for feeding back a codebook is provided, which is executed by a first device, and comprises: receiving first control information sent by a second device, the first control information scheduling the transmission by at least one physical channel, the first control information corresponding to a first control information format on a first cell, the maximum number of transmissions by physical channels scheduled by the first control information format on the first cell not being less than two, the at least one physical channel transmitting a corresponding HARQ-ACK codebook, and the HARQ-ACK codebook corresponding to a first feedback resource; and sending the HARQ-ACK codebook on the first feedback resource.

20 Claims, 11 Drawing Sheets

(56)　　　References Cited

U.S. PATENT DOCUMENTS

| | | | | |
|---|---|---|---|---|
| 2021/0050957 A1* | 2/2021 | Khoshnevisan | ...... | H04L 1/1854 |
| 2022/0174707 A1* | 6/2022 | Kim | ...................... | H04W 72/23 |
| 2022/0232603 A1* | 7/2022 | Xiao | ..................... | H04L 1/1854 |

FOREIGN PATENT DOCUMENTS

| | | |
|---|---|---|
| CN | 111726204 A | 9/2020 |
| CN | 112398607 A | 2/2021 |
| CN | 112398631 A | 2/2021 |
| WO | 2020197195 A1 | 10/2020 |
| WO | 2021008238 A1 | 1/2021 |

OTHER PUBLICATIONS

LG Electronics: "PDSCH/PUSCH enhancements to support NR above 52.6 GHz", 3GPP Draft; R1-2103343, 3rd Generation Partnership Project (3GPP), Mobilecompetence Centre ; 650, Route Des Lucicles ; F-06921 Sophia-Antipolis Cedex; France vol. RAN WG1, No. e-Meeting; Apr. 12, 2021-Apr. 20, 2021, Apr. 7, 2021 (Apr. 7, 2021), XP052178098, the whole document, 22 pages.

Supplementary European Search Report in the European application No. 21941289.7, mailed on Apr. 3, 2024, 8 pages.

Samsung, "HARQ-ACK Feedback for CBG-Based Retransmissions", 3GPP TSG RAN WG1 Meeting #89 R1-1708033 Hangzhou, P.R. China May 15-19, 2017,. 3 pages.

International Search Report in the international application No. PCT/CN2021/093163, mailed on Feb. 10, 2022. 6 pages with English translation.

Written Opinion of the International Search Authority in the international application No. PCT/CN2021/093163, mailed on Feb. 10, 2023. 6 pages with English translation.

Moderator (LG Electronics), "Summary #3 of PDSCH/PUSCH enhancements (Scheduling/HARQ)", 3GPP TSG RAN WG1 #104b-e R1-2104042 e-Meeting, Apr. 12-20, 2021,. 82 pages.

"3rd Generation Partnership Project; Technical Specification Group Services and System Aspects; Vocabulary for 3GPP Specifications (Release 16)", 3GPP TR 21.905 V16.0.0 (Jun. 2019), cited in p. 35-38. 66 pages.

* cited by examiner

| Condition 1 | First HARQ-ACK codebook | Second HARQ-ACK codebook | SPS physical channel feedback |
|---|---|---|---|

| Condition 2 | First HARQ-ACK codebook | SPS physical channel feedback | Second HARQ-ACK codebook |
|---|---|---|---|

| Condition 3 | SPS physical channel feedback | First HARQ-ACK codebook | Second HARQ-ACK codebook |
|---|---|---|---|

| Condition 4 | Second HARQ-ACK codebook | First HARQ-ACK codebook | SPS physical channel feedback |
|---|---|---|---|

| Condition 5 | Second HARQ-ACK codebook | SPS physical channel feedback | First HARQ-ACK codebook |
|---|---|---|---|

| Condition 6 | SPS physical channel feedback | Second HARQ-ACK codebook | First HARQ-ACK codebook |
|---|---|---|---|

FIG. 6

METHOD, APPARATUS AND DEVICE FOR FEEDING BACK CODEBOOK, AND STORAGE MEDIUM

CROSS-REFERENCE TO RELATED APPLICATION

This is a continuation application of International Patent Application No. PCT/CN2021/093163, filed on May 11, 2021, the content of which is hereby incorporated by reference in its entirety.

BACKGROUND

In new radio (NR), a terminal device can use a Hybrid Automatic Repeat Request-Acknowledgement (HARQ-ACK) codebook to feed back physical channel(s) scheduled by control information such as downlink control information (DCI) in a set of detection opportunities.

With the evolution of communication systems, it is considered to introduce a scheduling manner of using a DCI to schedule multiple physical channels. In the case of introducing such scheduling manner, how to perform the HARQ-ACK codebook feedback has not provided a better solution.

SUMMARY

Embodiments of the disclosure relate to a technical field of communication, particularly to a method for codebook feedback, an apparatus for codebook feedback, a device and a storage medium.

The embodiments of the disclosure provide a method for codebook feedback, an apparatus for codebook feedback, a device and a storage medium. The technical solutions are as following.

According to one aspect of embodiments of the disclosure, a method for codebook feedback is provided, where the method is performed by a first device, and the method includes the following operations:

the first device receives first control information from a second device, herein, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource;

the first device sends the HARQ-ACK codebook on the first feedback resource.

According to one aspect of embodiments of the disclosure, a method for codebook feedback is provided, where the method is performed by a second device, and the method includes the following operations:

the second device sends first control information to a first device, where the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource;

the second device receives the HARQ-ACK codebook on the first feedback resource.

According to one aspect of embodiments of the disclosure, a terminal device is provided, and the terminal device includes a transceiver.

The transceiver is configured to receive first control information from a second device, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

The transceiver is further configured to send the HARQ-ACK codebook on the first feedback resource.

BRIEF DESCRIPTION OF THE DRAWINGS

In order to more clearly explain the technical solutions in the embodiments of the disclosure, the drawings needed to be used in the description of the embodiments will be briefly introduced below. It will be understood that the drawings described below are merely some embodiments of the disclosure, and other drawings can be obtained from these drawings without creative efforts for the ordinary skilled person in the art.

FIG. 6 is a schematic diagram of a HARQ-ACK codebook according to an embodiment of the disclosure.

DETAILED DESCRIPTION

In order to make objectives, technical solutions and advantages of the disclosure clearer, the embodiments of the disclosure will be described in further details below with reference to the accompanying drawings.

Network architectures and service scenarios described by the embodiments of the disclosure are intended to more clearly explain the technical solutions of the embodiments of the disclosure, and do not constitute a limitation to the technical solutions according to the embodiments of the disclosure. The ordinary skilled person in the art can know that, with the evolution of the network architectures and the emergence of new service scenarios, the technical solutions according to the embodiments of the disclosure are equally applicable to similar technical problems.

Figure 1:
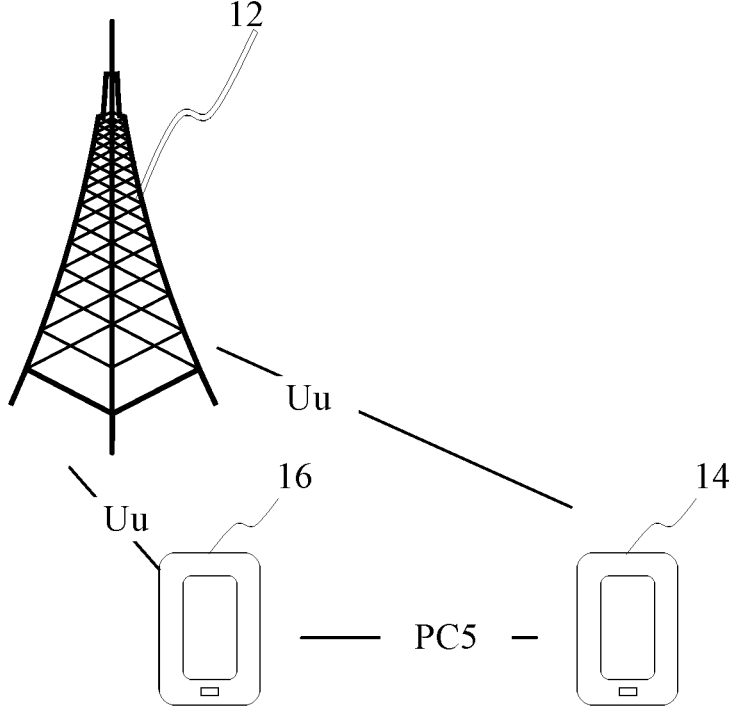
FIG. 1 is a schematic diagram of a network architecture according to an embodiment of the disclosure.

Referring to FIG. 1, FIG. 1 shows a schematic diagram of a network architecture according to an exemplary embodiment of the disclosure. The network architecture may include a network device 12, a first terminal 14 and a second terminal 16.

Multiple network devices 12 are included in an access network. The network device 12 may be a base station, which is a device deployed in the access network to provide wireless communication functions for terminals. The base station may include various forms of macro base stations, micro base stations, relay stations, access points, and the like. In systems with different wireless access technologies, the names of devices with the functions of the base station may be different. For example, in a LTE system, the device is called an eNodeB or an eNB. In a 5G NR-U system, the device is called a gNodeB or a gNB. With the evolution of communication technologies, the description of the term "base station" may be varied. For the convenience of the embodiment of the disclosure, the aforementioned devices, which provide the wireless communication functions for the terminal devices (e.g., the first terminal 14 and the second terminal 16), are collectively referred to as network devices.

The first terminal 14 (or the second terminal 16) may refer to a user equipment (UE), an access terminal, a subscriber unit, a subscriber station, a mobile radio station, a mobile station, a remote station, a remote terminal, a mobile device, a wireless communication device, a user agent, or a user device. Alternatively, the first terminal 14 (or the second terminal 16) may further be a cellular telephone, a cordless telephone, a Session Initiation Protocol (SIP) telephone, a Wireless Local Loop (WLL) station, a Personal Digital Assistant (PDA), a handheld device with wireless communication functionality, a computing device or other processing device connected to a wireless modem, a vehicle-mounted device, a wearable device, a terminal device in a 5th Generation System (5GS) or a terminal device in a future evolved Public Land Mobile Network (PLMN), etc. Embodiments of the disclosure are not limited in this regard.

In one example, the network device 12 and the first terminal 14 (or the second terminal 16) communicate with each other through a certain air interface technique, such as, a Uu interface. Alternatively, the network device 12 transmits a downlink physical channel to the first terminal 14 (or the second terminal 16). Alternatively, the first terminal 14 (or the second terminal 16) sends a HARQ-ACK codebook to the network device 12 through an uplink resource, and the HARQ-ACK codebook includes a decoding result of the downlink physical channel.

In one example, sidelink communication between the first terminal 14 and the second terminal 16 is performed through a certain air interface technique, such as, a PC5 interface. Alternatively, the second terminal 16 transmits a sidelink physical channel to the first terminal 14. Alternatively, the first terminal 14 sends the HARQ-ACK codebook to the second terminal 16 through a sidelink resource, and the HARQ-ACK codebook includes a decoding result of the sidelink physical channel.

The technical solutions of the embodiments of the disclosure can be applied to various communication systems, such as, a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced Long Term Evolution (LTE-A) system, a New Radio (NR) system, an evolution system of the NR system, a LTE-based access to Unlicensed spectrum (LTE-U) system, a NR-U system, a Universal Mobile Telecommunication System (UMTS), a Worldwide Interoperability for Microwave Access (WiMAX) communication system, a Wireless Local Area Networks (WLAN), a Wireless Fidelity (WiFi), a next generation communication system, or other communication systems.

Generally, a traditional communication system supports a limited number of connections, which is easy to be implemented. However, with the development of communication technologies, a mobile communication system may not only support the traditional communication, but also support systems of, for example, Device to Device (D2D) communication, Machine to Machine (M2M) communication, Machine Type Communication (MTC), Vehicle to Vehicle (V2V) communication and Vehicle to Everything (V2X). Embodiments of the disclosure can further be applied to these communication systems.

Before introducing the technical solutions of the disclosure, some technical knowledge involved in the disclosure is firstly introduced and explained. It should be understood that the following related techniques as alternatives may be arbitrarily combined with the technical solutions of the embodiments of the disclosure and are within the scope of protection of the embodiments of the disclosure.

1) High Frequency

Currently, researches of the NR system mainly consider two frequency bands, a Frequency Range 1 (FR1) and a Frequency Range 2 (FR2). Here, the FR1 and FR2 include frequency domain ranges as shown in Table 1.

TABLE 1

| Definition of Frequency Band | |
| --- | --- |
| Frequency Band Definition | Corresponding frequency range |
| FR1 | 410 MHz-7.125 GHz |
| FR2 | 24.25 GHz-52.6 GHz |

With the evolution of the NR system, a technology of a new frequency band (i.e., a high frequency) has begun to be studied. The frequency domain ranges included in the new frequency band are shown in Table 2 and are referred to herein as a FRX for ease of description. It should be understood that the name of the frequency band should not constitute any limitation. For example, the FRX can be a FR3 or a FR2x.

TABLE 2

| New Frequency Band Range | |
| --- | --- |
| Frequency Band Definition | Corresponding frequency range |
| FRX | 52.6 GHz-71 GHz |

The FRX frequency band includes a licensed spectrum and an unlicensed spectrum. In other words, the FRX frequency band includes both an unshared spectrum and a shared spectrum.

The unlicensed spectrum is the spectrum divided by countries and regions and used for communication of radio devices. The unlicensed spectrum is typically considered as the shared spectrum. That is, the spectrum can be used by communication devices in different communication systems as long as they meet regulatory requirements set by the countries or regions on the spectrum, without applying for a proprietary spectrum license from the government.

In order to enable various communication systems using the unlicensed spectrum for wireless communication to coexist amicably on the spectrum, some countries or regions have stipulated the regulatory requirements that must be met when using the unlicensed spectrum. For example, the communication device follows a principle of "Listen Before Talk (LBT)". That is, the communication device needs to firstly listen to a channel of unlicensed spectrum before the communication device sends signals on the channel. Only when a channel listening result is that the channel is idle, the communication device can send the signals. If the channel listening result of the communication device on the channel of the unlicensed spectrum is channel busy, the communication device cannot send the signals. For another example, in order to ensure fairness, in one transmission, the duration of signal transmission performed by the communication device using the channel of the unlicensed spectrum cannot exceed a certain time length. For another example, in order to prevent the power of the signals transmitted on the channel of the unlicensed spectrum from being too large and affecting the transmission of other important signals on the channel, the communication device needs to follow a limit of not exceeding a maximum power spectral density when transmitting the signals by using the channel of the unlicensed spectrum.

A subcarrier spacing considered in the FRX frequency band may be greater than a subcarrier spacing in the FR2. The current candidate subcarrier spacing includes at least one of: 120 kHz, 240 kHz, 480 kHz, or 960 kHz.

2) Dynamic Codebook Feedback

For the terminal device with downlink services, the network device may schedule a transmission of a Physical Downlink Shared Channel (PDSCH) for the terminal device through a downlink grant DCI. Here, the downlink grant DCI includes indication information for Physical Uplink Control Channel (PUCCH) resource, and the terminal device feeds back a decoding result (ACK information or NACK information) of the PDSCH to the network device through the PUCCH resource after receiving the PDSCH. Dynamic determination for HARQ feedback timing is supported in the NR system. The network device receives the PDSCH through DCI scheduling the terminal device. The DCI includes indication information for the PUCCH resource of HARQ-ACK corresponding to the transmission of the PDSCH.

Specifically, the indication information may include:

PUCCH resource indicator information, which is used to determine the PUCCH resource;

PDSCH-to-HARQ feedback timing indicator information, which is used to dynamically determine a time domain location of a HARQ feedback resource, e.g., a slot of the HARQ feedback resource, typically denoted by $K1$.

The PDSCH-to-HARQ feedback timing indicator information is used to indicate a value in a HARQ feedback timing set. The HARQ feedback timing set can be preset or configured by the network device. As an example, the PDSCH-to-HARQ feedback timing indicator information includes 3 bits. When the PDSCH-to-HARQ feedback timing indicator information is 000, it indicates a first value in the HARQ feedback timing set; when the PDSCH-to-HARQ feedback timing indicator information is 001, it indicates a second value in the HARQ feedback timing set, and so on. If the PDSCH-to-HARQ feedback timing indicator information indicates an invalid $K1$ in the HARQ feedback timing set (e.g., the indicated $K1$ value is $-1$), it indicates that the slot in which the PUCCH resource is located is temporarily undetermined.

When the terminal device performs the HARQ-ACK feedback, the HARQ-ACK feedback includes a semi-persistent codebook feedback (e.g., a Type-1 HARQ-ACK codebook feedback or a Type-3 HARQ-ACK codebook feedback) and a dynamic codebook feedback (e.g., a Type-2 HARQ-ACK codebook feedback or an eType-2 HARQ-ACK codebook feedback).

If the terminal device is configured to use the Type-2 HARQ-ACK codebook feedback, the Type-2 HARQ-ACK codebook includes HARQ-ACK information corresponding to a scheduled PDSCH in a HARQ-ACK feedback window. A DCI format for scheduling the PDSCH includes a Downlink Assignment Index (DAI) information field:

counter-DAI (C-DAI) information, which is used to determine which downlink transmission within the HARQ feedback window is the downlink transmission currently scheduled by the DCI. Here, the C-DAI information is sorted according to an order of detection opportunities for the PDCCH.

In some cases, such as a scenario of carrier aggregation, the DCI may further include:

total-DAI (T-DAI) information, which is used to determine how many downlink transmissions are included in the HARQ feedback window up to the downlink transmissions currently scheduled by the DCI.

Figure 2:
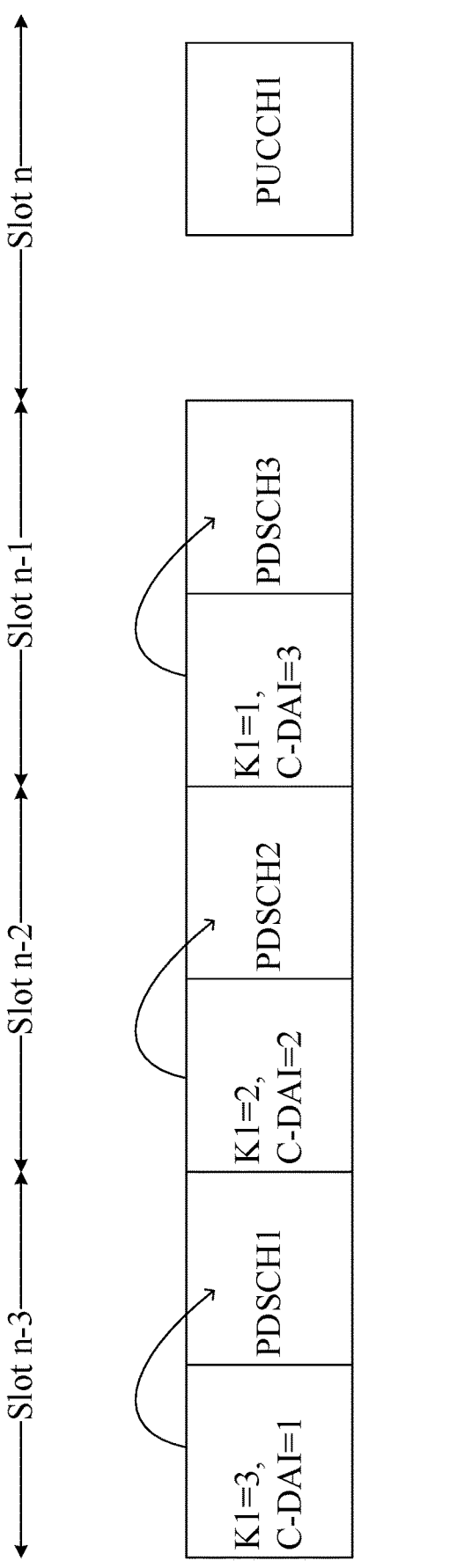
FIG. 2 is a schematic diagram of Counter-Downlink Assignment Index (C-DAI) indication under a Type-2 HARQ-ACK codebook feedback according to an embodiment of the disclosure.

FIG. 2 shows an example of the C-DAI indication under the Type-2 HARQ-ACK codebook feedback. As shown in FIG. 2, if $K1$ in the DCI received by the terminal device on the slot n-3 is 3 and C-DAI=1, the DCI schedules the PDSCH1; if $K1$ in the DCI received on slot n-2 is 2 and C-DAI=2, the DCI schedules the PDSCH2; and, if $K1$ in the DCI received at the slot n-1 is 1 and C-DAI=3, the DCI schedules the PDSCH3. That is, the PDSCH-to-HARQ feedback timing indicator information $K1$ included in the DCI indicates that a feedback time unit is a slot n, and the PDSCH1, the PDSCH2 and the PDSCH3 are the first downlink transmission, the second downlink transmission and the third downlink transmission in the HARQ feedback window, respectively.

Table 3 shows a schematic table for indicating the number of downlink transmissions when the C-DAI information in the DCI for a downlink scheduling includes 2 bits. Table 4 shows a schematic table for indicating the number of downlink transmissions when the C-DAI information in the DCI for the downlink scheduling includes 1 bit. Here, LSB represents a Least Significant Bit (LSB), and MSB represents a Most Significant Bit (MSB).

Table 4 is taken as an example for interpretation. As shown in Table 4, a value range of the C-DAI information is from 1 to 4. Assuming that the value indicated by the C-DAI information received by the terminal device is M, the terminal device determines which downlink transmission corresponding to the value of M according to the C-DAI information and the reception of the downlink transmissions. For example, for the first downlink transmission, C-DAI=1; for the second downlink transmission, C-DAI=2; for the third downlink transmission, C-DAI=3; for the fourth downlink transmission, C-DAI=4; for the fifth downlink transmission, C-DAI=1; for the sixth downlink transmission, C-DAI=2; for the seventh downlink transmission, C-DAI=3; for the eighth downlink transmission, C-DAI=4; and so on.

TABLE 3

| Number of Downlink Transmissions | | |
| --- | --- | --- |
| 2 bits of DAI information: MSB, LSB | Value of C-DAI information or T-DAI information | $Y \geq 1$, Y denotes which number of the downlink transmission or the number of downlink transmissions, $T_D = 4$ |
| 0, 0 | 1 | $(Y - 1) \bmod T_D + 1 = 1$ |
| 0, 1 | 2 | $(Y - 1) \bmod T_D + 1 = 2$ |
| 1, 0 | 3 | $(Y - 1) \bmod T_D + 1 = 3$ |
| 1, 1 | 4 | $(Y - 1) \bmod T_D + 1 = 4$ |

TABLE 4

| Number of Downlink Transmissions | | |
| --- | --- | --- |
| 1 bit of DAI information: LSB | Value of C-DAI Information | $Y \geq 1$, Y denotes which number of the downlink transmission or the number of downlink transmissions, $T_D = 2$ |
| 0 | 1 | $(Y - 1) \bmod T_D + 1 = 1$ |
| 1 | 2 | $(Y - 1) \bmod T_D + 1 = 2$ |

3) CBG-Based Transmission and Feedback

In the NR system, for a certain serving cell, if the terminal device is configured to use a Code Block Group (CBG)-based transmission, at least one CBG is included in a Transport Block (TB) of a PDSCH scheduled by a DCI (e.g., a DCI format 1_1) in a non-fallback mode received by the terminal device. The PDSCH transmission in this case corresponds to a CBG feedback.

Accordingly, the terminal device is further provided with a parameter for indicating the maximum number N of CBGs included in a TB transmitted by the serving cell, such as, maxCodeBlockGroupsPerTransportBlock. The parameter is used for the terminal device to generate corresponding bits of the CBG-based HARQ-ACK information.

If one TB includes C Code Blocks (CBs) and the terminal device determines that the C CBs correspond to M CBGs, the terminal device determines that the number of bits of HARQ-ACK information corresponding to the TB is M.

If the terminal device correctly receives all CBs included in one CBG, the bits of the HARQ-ACK information generated by the terminal device for the CBG are ACK. If the terminal device does not correctly receive at least one CB included in the CBG, the bits of the HARQ-ACK information generated by the terminal device for the CBG are NACK. If the terminal device receives two TBs, the terminal device cascades the bits of HARQ-ACK information corresponding to the CBGs included in the second TB after the bits of HARQ-ACK information corresponding to the CBGs included in the first TB.

The CBG-based HARQ-ACK codebook includes the bits of HARQ-ACK information with N bits, and if M<N for one TB, the terminal device generates a NACK for each of the last (N-M) bits of HARQ-ACK information of the TB in the HARQ-ACK codebook.

For one TB previously transmitted in one HARQ process, if the terminal device needs to generate a corresponding HARQ-ACK codebook for retransmission of the TB, the terminal device generates an ACK for each CBG correctly decoded during the previous transmission of the TB.

If the terminal device correctly detects each CBG of M CBGs included in the TB (e.g., Cyclical Redundancy Check (CRC) is successful for each CBG), but does not correctly detect the M CBGs (e.g., the CRC for the TB is failed, or the CRC for the M CBGs is failed), the terminal device generates a NACK for each CBG of the M CBGs.

It should be understood that the foregoing is an exemplary illustration of the PDSCH transmission corresponding to the CBG feedback. If the terminal device receives a PDSCH scheduled by a DCI (i.e., a DCI format 1_0) in a fallback mode, or, if the terminal device receives a Semi-Persistent Scheduling (SPS) PDSCH, a transport block is included in the PDSCH, in this case, the PDSCH transmission corresponds to a TB feedback.

4) One DCI Scheduling Multiple Downlink Transmissions

In the high-frequency system, a time length occupied by each slot is short because of a large subcarrier spacing. If the manner for scheduling the PDSCH in each slot in the low-frequency system is continued to be used, the terminal device may be required to detect the PDCCH in each slot, which requires the terminal device to have a strong processing capacity. In order to reduce the requirements for the processing capacity of the terminal device, it may be considered to introduce a scheduling manner of using one DCI to schedule multiple physical channels.

Taking the downlink transmissions as an example, the network device may use one DCI to schedule at least two physical channels (e.g., PDSCH transmissions), or use one DCI to activate at least two downlink resources to use for at least two physical channel transmissions (here, the at least two downlink resources may belong to the same SPS resource configuration, or, may belong to different SPS resource configurations). The at least two physical channels include a first physical channel and a second physical channel. The first physical channel and the second physical channel may be used to transmit different Transport Blocks (TBs), or, the first physical channel and the second physical channel may be used to transmit the same TB.

Figure 3:
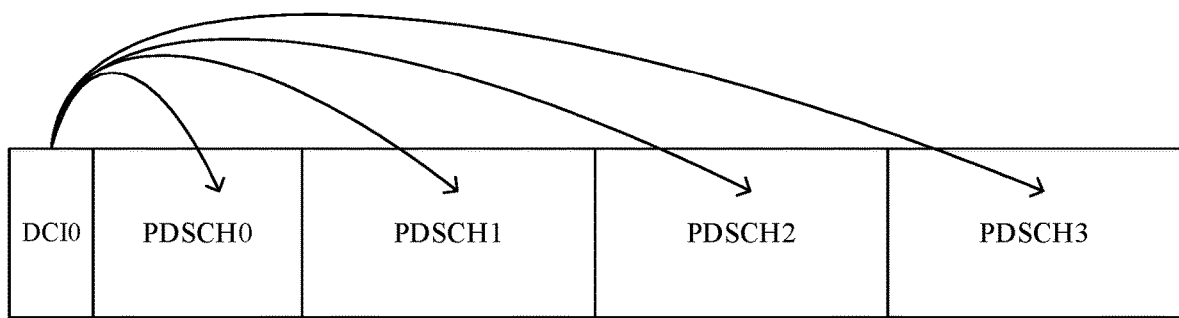
FIG. 3 is a schematic diagram of a DCI scheduling multiple downlink transmissions according to an embodiment of the disclosure.

As shown in FIG. 3, the network device may use a DCI0 to schedule four PDSCH transmissions, the four PDSCH include a PDSCH0, a PDSCH1, a PDSCH2, and a PDSCH3. The PDSCH0, PDSCH1, PDSCH2, and PDSCH3 are used to transmit different TBs, respectively.

Based on the aforementioned introduction, for the high-frequency system, it is considered to introduce a scheduling manner of using one DCI to schedule multiple physical channels. In the case of introducing such scheduling manner, how to perform the HARQ-ACK codebook feedback has not provided a better solution in the relevant technologies.

Next, the technical solutions of the disclosure will be introduced and explained through several embodiments.

Figure 4:
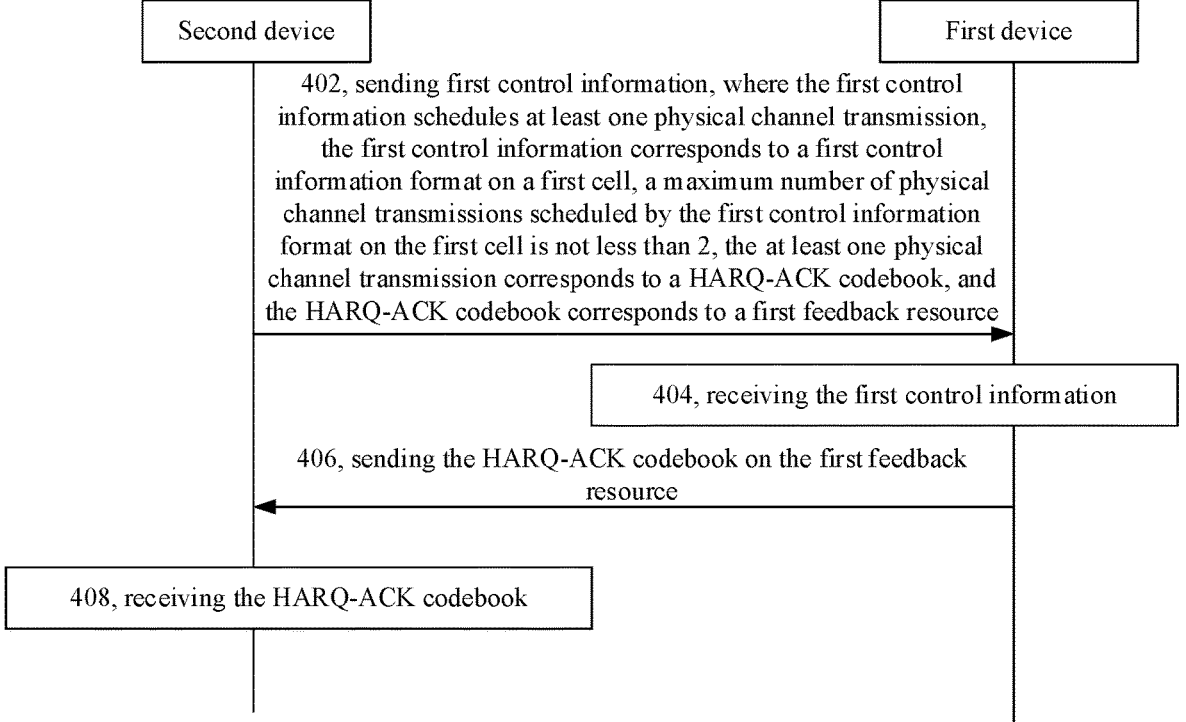
FIG. 4 is a flowchart of a method for codebook feedback according to an embodiment of the disclosure.

Referring to FIG. 4, FIG. 4 shows a flowchart of a method for codebook feedback according to an embodiment of the disclosure. The method may be applied to the network architecture shown in FIG. 1. The method may include some or all of the following operations (e.g., operations 402 to 408).

In the operation 402, a second device sends first control information to the first device. The first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

In some embodiments of the disclosure, the control information corresponds to multiple different control information formats, such as, a first control information format and a second control information format. The first device may receive a scheduled transmission of the control information corresponding to the respective control information format on the cell.

Here, the first device is configured to use the first control information format on the first cell, and the first control information format on the first cell supports the maximum number of scheduled physical channel transmissions not less than 2. The first control information is control information corresponding to the first control information format, therefore, the first control information supports scheduling at least one physical channel transmission.

Exemplarily, the control information is a DCI, the first control information format is in a non-fallback mode (e.g., a DCI format 1_1), and the DCI in the non-fallback mode supports one DCI to schedule multiple physical channel transmissions.

In some embodiments of the disclosure, the second control information format is in a fallback mode (e.g., a DCI format 1_0). The second control information format may be predefined.

In some embodiments of the disclosure, multiple physical channel transmissions scheduled by the first control information format include that: the maximum number of scheduled physical channels supported by the first control information format is greater than 1, and the control information of the first control information format schedules one or more physical channel transmissions. Alternatively, the multiple physical channel transmissions scheduled by the first control information format include that: the maximum number of scheduled physical channels supported by the first control information format is greater than 1, and the control information of the first control information format schedules the multiple physical channel transmissions.

In the operation 404, the first device receives the first control information.

Correspondingly, the first device receives the first control information from the second device.

In the operation 406, the first device sends the HARQ-ACK codebook on the first feedback resource.

Here, the first feedback resource is a time-frequency domain resource adopted for transmitting the HARQ-ACK codebook.

In some embodiments of the disclosure, after receiving the first control information and then receiving the physical channel scheduled by the first control information, the first device performs a feedback for the physical channel transmissions through feedback information carried in the HARQ-ACK codebook.

Alternatively, the feedback information carried in the HARQ-ACK codebook includes feedback information corresponding to at least one physical channel scheduled by the first control information. Alternatively, the feedback information carried in the HARQ-ACK codebook includes feedback information corresponding to at least one physical channel scheduled by the first control information, and feedback information corresponding to one or more physical channels scheduled by other control information and/or feedback information corresponding to other control information.

In the operation 408, the second device receives the HARQ-ACK codebook.

Accordingly, the second device receives the HARQ-ACK codebook on the first feedback resource from the first device.

In a possible implementation, the first device is a terminal, the second device is a network device, the physical channel includes a downlink physical channel, and the first feedback resource includes an uplink resource.

Exemplarily, the control information in the implementation includes a DCI. Exemplarily, the first feedback resource in the implementation includes a PUCCH resource and a Physical Uplink Shared Channel (PUSCH) resource.

In another possible implementation, the first device is a first terminal, the second device is a second terminal, the physical channel includes a sidelink physical channel, and the first feedback resource includes a sidelink resource.

Exemplarily, the control information in the implementation includes the sidelink control information and the DCI. Exemplarily, the first feedback resource in the implementation includes a Physical Sidelink Feedback Channel (PSFCH) resource.

It should be understood that, in addition to the aforementioned two possible implementations, the technical solutions shown in the disclosure can further be applied to other types of communication modes, and the embodiments of the disclosure are not limited in this regard.

To sum up, in the technical solutions provided by the embodiments, in the case of introducing the scheduling manner of using one piece of control information to schedule the multiple physical channels, when the first device in the communication system receives the first control information, and the first control information corresponds to the first control information format on the first cell, and the maximum number of physical channel transmissions scheduled by the first control information format on the first cell is not less than 2, the first device may send the HARQ-ACK codebook corresponding to at least one physical channel scheduled by the first control information through the first feedback resource, thus, providing a method for codebook feedback for the newly introduced scheduling manner.

In an alternative embodiment based on FIG. 4, the HARQ-ACK codebook has the following two possible conditions.

Condition 1: the HARQ-ACK codebook includes two subcodebooks, i.e., a first HARQ-ACK subcodebook and a second HARQ-ACK subcodebook.

Alternatively, the number of bits of feedback information corresponding to each control information in the first HARQ-ACK subcodebook is different from the number of bits of feedback information corresponding to each control information in the second HARQ-ACK subcodebook.

Exemplarily, the number of bits of feedback information corresponding to each control information in the first HARQ-ACK subcodebook is denoted as M1, and M1 is a positive integer. The number of bits of feedback information corresponding to each control information in the second HARQ-ACK subcodebook is denoted as M2, and M2 is a positive integer. Alternatively, M2 is greater than M1.

Condition 2: there is only one HARQ-ACK codebook.

Exemplarily, the number of bits of feedback information corresponding to each control information in the HARQ-ACK codebook is denoted as M3, and M3 is a positive integer.

Condition 3: the HARQ-ACK codebook includes three subcodebooks, i.e., the first HARQ-ACK subcodebook, the second HARQ-ACK subcodebook and a third HARQ-ACK subcodebook.

Alternatively, for any two subcodebooks from the first HARQ-ACK subcodebook, the second HARQ-ACK subcodebook and the third HARQ-ACK subcodebook, the number of bits of feedback information corresponding to one piece of control information in one of the any two subcodebooks is different from the number of bits of feedback information corresponding to one piece of control information in another one of the any two subcodebooks.

Exemplarily, the number of bits of feedback information corresponding to each control information in the first HARQ-ACK subcodebook is denoted as M4, and M4 is a positive integer. The number of bits of feedback information corresponding to each control information in the second HARQ-ACK subcodebook is denoted as M5, and M5 is a positive integer. The number of bits of feedback information corresponding to each control information in the third HARQ-ACK subcodebook is denoted as M6, and M6 is a positive integer. Alternatively, any two values of M4, M5 and M6 have different values.

Hereinafter, an exemplary description for the aforementioned conditions will be provided.

Condition 1:

In an exemplary embodiment, the HARQ-ACK codebook includes two subcodebooks, i.e., the first HARQ-ACK subcodebook and the second HARQ-ACK subcodebook. The first feedback resource is used to feed back at least two sets of feedback information corresponding to at least two sets of control information, and at least one set of the at least two sets of feedback information includes feedback information of the physical channel transmissions scheduled by the first control information.

That is, the aforementioned operation 406 may be alternatively implemented as: the first device sends the first HARQ-ACK subcodebook and the second HARQ-ACK subcodebook on the first feedback resource, and at least two sets of feedback information are respectively carried in the first HARQ-ACK subcodebook and the second HARQ-ACK subcodebook which are cascaded. Here, the number of bits of feedback information corresponding to each control information in the first HARQ-ACK subcodebook is less than the number of bits of feedback information corresponding to each control information in the second HARQ-ACK subcodebook.

Accordingly, the aforementioned operation 408 may be alternatively implemented as: the second device receives the first HARQ-ACK subcodebook and the second HARQ-ACK subcodebook on the first feedback resource, and at least two sets of feedback information are respectively carried in the first HARQ-ACK subcodebook and the second HARQ-ACK subcodebook which are cascaded. Here, the number of bits of feedback information corresponding to each control information in the first HARQ-ACK subcodebook is less than the number of bits of feedback information corresponding to each control information in the second HARQ-ACK subcodebook.

Hereinafter, control information corresponding to feedback information included in the first HARQ-ACK subcodebook and the second HARQ-ACK subcodebook will be described.

In one example, under a condition that the first control information schedules multiple physical channel transmissions, feedback information corresponding to the first control information is carried in the second HARQ-ACK subcodebook. Here, the feedback information corresponding to the first control information includes HARQ-ACK information corresponding to the multiple physical channel transmissions.

Exemplarily, the first control information is the DCI, and the first control information format is the DCI format 1_1. When the DCI with the DCI format 1_1 schedules multiple PDSCH transmissions, the feedback information corresponding to the DCI is carried in the second HARQ-ACK subcodebook, and the feedback information corresponding to the DCI includes HARQ-ACK information corresponding to multiple PDSCH transmissions.

In one example, under a condition that the first control information schedules a transmission of a physical channel and the physical channel corresponds to a CBG feedback, the feedback information corresponding to the first control information is carried in the second HARQ-ACK subcodebook. Here, the feedback information corresponding to the first control information includes HARQ-ACK information of a CBG-based feedback corresponding to the transmission of the physical channel.

Exemplarily, the first control information is the DCI, and the first control information format is the DCI format 1_1. Under a condition that the DCI with the DCI format 1_1 schedules one PDSCH transmission and the PDSCH corresponds to the CBG feedback, the feedback information corresponding to the DCI is carried in the second HARQ-ACK subcodebook, and the feedback information corresponding to the DCI includes the HARQ-ACK information of a CBG-based feedback corresponding to the PDSCH transmission.

In one example, under a condition that the first control information schedules the multiple physical channel transmissions and the multiple physical channels corresponds to the CBG feedback, the feedback information corresponding to the first control information is carried in the second HARQ-ACK subcodebook. Here, the feedback information corresponding to the first control information includes the HARQ-ACK information of the CBG-based feedback corresponding to the multiple physical channel transmissions.

Exemplarily, the first control information is the DCI, and the first control information format is the DCI format 1_1. Under a condition that the DCI with the DCI format 1_1 schedules the multiple PDSCH transmissions and the multiple PDSCHs correspond to the CBG feedback, the feedback information corresponding to the DCI is carried in the second HARQ-ACK subcodebook, and the feedback information corresponding to the DCI includes the HARQ-ACK information of the CBG-based feedback corresponding to the multiple PDSCH transmissions.

In one example, under a condition that the first control information schedules a transmission of a physical channel and the physical channel corresponding to a TB feedback, the feedback information corresponding to the first control information is carried in the first HARQ-ACK subcodebook. Or, under a condition that the first control information schedules a transmission of a physical channel and the physical channel corresponds to the TB feedback, the feedback information corresponding to the first control information is carried in the second HARQ-ACK subcodebook. Or, under a condition that the number of bits of feedback information corresponding to the first control information is less than or equal to the number of bits of feedback information corresponding to each control information in the first HARQ-ACK subcodebook, the feedback information corresponding to the first control information is carried in the first HARQ-ACK subcodebook. Or, under a condition that the number of bits of feedback information corresponding to the first control information is greater than the number of bits of feedback information corresponding to each control information in the first HARQ-ACK subcodebook, the feedback information corresponding to the first control information is carried in the second HARQ-ACK subcodebook. Here, the feedback information corresponding to the first control information includes HARQ-ACK information of a TB-based feedback corresponding to the transmission of the physical channel which is scheduled by the first control information.

Exemplarily, the first control information is the DCI, and the first control information format is the DCI format 1_1. Under a condition that the DCI with the DCI format 1_1 schedules one PDSCH transmission and the PDSCH corresponds to the TB feedback, the feedback information corresponding to the DCI is carried in the first HARQ-ACK subcodebook or the second HARQ-ACK subcodebook, and the feedback information corresponding to the DCI includes the HARQ-ACK information of a TB-based feedback corresponding to the PDSCH transmission.

Exemplarily, the first control information is the DCI, the first control information format is the DCI format 1_1, the number of bits of feedback information corresponding to each control information in the first HARQ-ACK subcodebook is 2. Under a condition that the number of bits of feedback information corresponding to the DCI with the DCI format 1_1 is less than or equal to 2 (e.g., scheduling one PDSCH transmission and corresponding to 1 bit or 2 bit feedback information, or, scheduling two PDSCH transmissions and each PDSCH transmission corresponds to 1 bit feedback information), the feedback information corresponding to the DCI is carried in the first HARQ-ACK subcodebook. Or, under a condition that the number of bits of the feedback information corresponding to the DCI with the DCI format 1_1 is greater than 2, the feedback information corresponding to the DCI is carried in the second HARQ-ACK subcodebook.

In one example, the second HARQ-ACK subcodebook is further used to carry feedback information corresponding to a first-type of control information, and the first-type of control information includes at least one of the following:

Control information of a first control information format on a second cell is included in the first-type of control information, where the control information of the first control information format on the second cell schedules a transmission of a physical channel and the physical channel corresponds to a CBG feedback.

Here, the first device is configured to use the first control information format on the second cell, and the first control information format on the second cell supports scheduling a transmission of a physical channel and the physical channel corresponds to the CBG feedback.

Alternatively, the first cell and the second cell include the same cell. Alternatively, the first cell and the second cell include different cells.

Control information of the first control information format on the second cell is included in the first-type of control information, where the number of bits of feedback information corresponding to the control information of the first control information format on the second cell is greater than the number of bits of feedback information corresponding to each control information in the first HARQ-ACK subcodebook.

Exemplarily, the first control information is the DCI, the first control information format is the DCI format 1_1, and the number of bits of feedback information corresponding to each control information in the first HARQ-ACK subcodebook is 2. Under a condition that the number of bits of feedback information corresponding to the DCI of the DCI format 1_1 on the second cell is greater than 2, the feedback information corresponding to the DCI is carried in the second HARQ-ACK subcodebook.

Control information of the first control information format is included in the first-type of control information, where the control information of the first control information format is used to activate one or more physical channel transmissions in a semi-persistent scheduling (SPS), and a maximum number of the activated physical channel transmissions in the semi-persistent scheduling within a semi-persistent transmission period is not less than 2.

Accordingly, the feedback information corresponding to the first-type of control information includes at least one of: HARQ-ACK information of the CBG-based feedback corresponding to the transmission of the physical channel, the transmission of the physical channel is a transmission of a physical channel scheduled by the control information of the first control information format on the second cell and the physical channel corresponds to the CBG feedback; feedback information corresponding to the transmission(s) of the physical channel(s) scheduled by the control information of the first control information format on the second cell, the number of bits of the feedback information is greater than the number of bits of the feedback information corresponding to each control information in the first HARQ-ACK subcodebook; HARQ-ACK information corresponding to activated one or more physical channel transmissions in the semi-persistent scheduling, the one or more physical channel transmissions in the semi-persistent scheduling are activated by the control information of the first control information format, and the maximum number of the activated physical channel transmissions in the semi-persistent scheduling within a semi-persistent transmission period is not less than 2.

In one example, the first HARQ-ACK subcodebook is used to carry feedback information corresponding to a second-type of control information, and the second-type of control information includes at least one of the following.

Control information of a first control information format on a second cell is included in the second-type of control information, where the number of bits of feedback information corresponding to the control information format on the second cell is less than or equal to the number of bits of feedback information corresponding to each control information in the first HARQ-ACK subcodebook.

Exemplarily, the first control information is the DCI, the first control information format is the DCI format 1_1, and the number of bits of feedback information corresponding to each control information in the first HARQ-ACK subcodebook is 2. Under a condition that the number of bits of feedback information corresponding to the PDSCH scheduled by the DCI of the DCI format 1_1 on the second cell is less than or equal to 2, the feedback information corresponding to the DCI is carried in the first HARQ-ACK subcodebook.

Control information of a second control information format is included in the second-type of control information, where the control information of the second control information format schedules a transmission of a physical channel and the physical channel corresponds to a TB feedback.

In some embodiments of the disclosure, the control information corresponds to multiple different control information formats, such as, a first control information format and a second control information format. The second control information format is a control information format different from the first control information format described above.

Exemplarily, the control information is the DCI, the first control information format is in the non-fallback mode (e.g., the DCI format 1_1), and the second control information format is in the fallback mode (e.g., the DCI format 1_0).

Control information of a first control information format on a third cell is included in the second-type of control information, where the control information of the first control information format on the third cell schedules a transmission of a physical channel and the physical channel corresponds to a TB feedback.

Here, the first device is configured to use the first control information format on the third cell, and the first control information format on the third cell does not support scheduling multiple physical channel transmissions, or not support scheduling one physical channel transmission and the physical channel corresponds to the CBG feedback.

Alternatively, the first cell and the third cell include different cells.

Control information of the second control information format is included in the second-type of control information, where the control information of the second control information format is used to activate one or more physical channel transmissions in a semi-persistent scheduling.

Control information of the first control information format is included in the second-type of control information, where the control information of the first control information format is used to activate one or more physical channel transmissions in the semi-persistent scheduling, and the maximum number of the activated physical channel transmissions in the semi-persistent scheduling within a semi-persistent transmission period is 1.

Control information for releasing physical channel transmissions in the semi-persistent scheduling is included in the second-type of control information.

Control information for indicating a Secondary Cell (SCell) dormancy of a SCell is included in the second-type of control information.

Control information that is not associated with physical channel transmissions and is required to send feedback information is included in the second-type of control information.

Accordingly, the feedback information corresponding to the second-type of control information includes at least one of: feedback information corresponding to the transmission(s) of the physical channel(s) scheduled by the control information of the first control information format on the second cell, and the number of bits of the feedback information is less than or equal to the number of bits of the feedback information corresponding to each control information in the first HARQ-ACK subcodebook; HARQ-ACK information of the TB-based feedback corresponding to the transmission of the physical channel, the transmission of the physical channel is a transmission of a physical channel scheduled by the control information of the second control information format, and the physical channel corresponds to the TB feedback; HARQ-ACK information of the TB-based feedback corresponding to the transmission of the physical channel, and the transmission of the physical channel is a transmission of a physical channel scheduled by the control information of the first control information format on the third cell, and the physical channel corresponds to the TB feedback; HARQ-ACK information corresponding to the activated physical channel transmissions in the semi-persistent scheduling, and the physical channel transmissions in the semi-persistent scheduling are activated by the control information of the second control information format; HARQ-ACK information corresponding to the activated physical channel transmissions in the semi-persistent scheduling, the physical channel transmissions in the semi-persistent scheduling are activated by the control information of the first control information format, and the maximum number of the activated physical channel transmissions in the semi-persistent scheduling within the semi-persistent transmission period is 1; feedback information corresponding to the control information for releasing the physical channel transmissions in the semi-persistent scheduling; feedback information corresponding to the control information for indicating the SCell dormancy of the secondary cell; and feedback information corresponding to the control information that is not associated with the physical channel transmissions and is required to send the feedback information.

In some embodiments, taking the control information to be the DCI as an example, the feedback information transmitted in the two HARQ-ACK subcodebooks can be exemplified and summarized.

1) The first HARQ-ACK subcodebook includes feedback information corresponding to at least one of the following conditions:

PDSCH transmission(s) scheduled by the DCI of the first DCI format;

one PDSCH transmission scheduled by the DCI of the first DCI format, and the PDSCH corresponding to the TB feedback;

one PDSCH transmission scheduled by the DCI of the second DCI format;

SPS PDSCH transmissions activated by the DCI of the first DCI format or the second DCI format;

under a condition that the SPS PDSCH transmissions are activated by the DCI of the first DCI format, the maximum number of the activated SPS PDSCH transmissions within the semi-persistent transmission period is 1;

PDCCH transmissions for releasing the SPS PDSCH;

PDCCH transmissions for indicating a Secondary Cell (SCell) dormancy of a SCell;

other PDCCH transmissions that are not associated with the PDSCH and are required feedback of HARQ-ACK information (e.g., an ACK).

2) The second HARQ-ACK subcodebook includes feedback information corresponding to at least one of the conditions:

PDSCH transmissions scheduled by the DCI of the first DCI format;

multiple PDSCH transmissions scheduled by the DCI of the first DCI format;

one PDSCH transmission scheduled by the DCI of the first DCI format, the PDSCH corresponding to the CBG feedback;

one PDSCH transmission scheduled by the DCI of the first DCI format, the PDSCH corresponding to the TB feedback;

SPS PDSCH transmissions activated by the DCI of the first DCI format, where the maximum number of the activated SPS PDSCH transmissions within the semi-persistent transmission period is not less than 2.

Exemplarily, the above first DCI format includes the DCI format 1_1, and the above second DCI format includes the DCI format 1_0.

Next, the number of bits of feedback information corresponding to each control information in the first HARQ-ACK subcodebook and the second HARQ-ACK subcodebook will be described.

1) The number M1 of bits of feedback information corresponding to each control information in the first HARQ-ACK subcodebook.

In one example, the number M1 of bits of feedback information corresponding to each control information in the first HARQ-ACK subcodebook is determined based on a first configuration parameter of a network device.

Or, the number M1 of bits of feedback information corresponding to each control information in the first HARQ-ACK subcodebook is equal to the maximum value of a first number A of bits of feedback information and a second number B of bits of feedback information.

Or, the number M1 of bits of feedback information corresponding to each control information in the first HARQ-ACK subcodebook is equal to the first number A of bits of feedback information.

Or, the number M1 of bits of feedback information corresponding to each control information in the first HARQ-ACK subcodebook is equal to the second number B of bits of feedback information.

That is, the M1 may be determined based on the parameter configured by the network device, or, $M1=\max\{A, B\}$. Alternatively, if there is no value of A, then $M1=B$; or, if there is no value of B, then $M1=A$.

Here, the first number A of bits of feedback information is determined based on the number of bits of feedback information corresponding to the first control information format on the third cell. The first device is not configured to use one piece of control information to schedule multiple physical channel transmissions and is not configured to use CBG transmissions. Here, on the third cell, one first control information format corresponds to A-bit feedback information.

In some embodiments, on the third cell, if the first device is configured to use the maximum number of TBs being 2 and is not configured to use a space division multiplexing feedback, then $A=2$; otherwise, $A=1$.

In some embodiments, if the third cell includes multiple cells, then A is the maximum value of the values determined in the manner described above. $A=\max\{A1, A2, \ldots\}$, where A1 is the number of bits of feedback information corresponding to the first control information format on the third cell 1; A2 is the number of bits of feedback information corresponding to the first control information format on the third cell 2, and so on. For example, assuming that the third cell includes the third cell 1 and the third cell 2, the number of bits of feedback information corresponding to one first control information format on the third cell 1 is 1, and the number of bits of feedback information corresponding to one first control information format on the third cell 2 is 2, then $A=\max\{1, 2\}=2$.

Here, the second number B of bits of feedback information is 1. Alternatively, under a condition that one transport block is included in the scheduled physical channel and the physical channel corresponds to the TB feedback, the number of bits of feedback information is 1.

For at least one of the following conditions, each condition corresponding to B-bit feedback information:

control information of a second control information format, where the control information of the second control information format schedules a transmission of a physical channel and the physical channel corresponds to a TB feedback;

control information of a second control information format, where the control information of the second control information format is used to activate one or more physical channel transmissions in a semi-persistent scheduling;

control information of the first control information format, where the control information of the first control information format is used to activate one or more physical channel transmissions in the semi-persistent scheduling, and the maximum number of the activated physical channel transmissions in the semi-persistent scheduling within the semi-persistent transmission period is 1;

control information for releasing physical channel transmission(s) in the semi-persistent scheduling;

control information for indicating a Secondary Cell (SCell) dormancy of a SCell;

control information that is not associated with physical channel transmissions and is required to send the feedback information.

Alternatively, under a condition that the number X of the HARQ-ACK feedback bits corresponding to one piece of received control information included in the first HARQ-ACK subcodebook is less than the number M1 of bits of feedback information corresponding to each control information, the HARQ-ACK feedback bits are filled in the first X bits of the M1 bits.

2) The number M2 of bits of feedback information corresponding to each control information in the second HARQ-ACK subcodebook In one example, the number M2 of bits of feedback information corresponding to each control information in the second HARQ-ACK subcodebook is determined based on a second configuration parameter of the network device.

Or, the number M2 of bits of feedback information corresponding to each control information in the second HARQ-ACK subcodebook is equal to the maximum value of a third number C of bits of feedback information and a fourth number D of bits of feedback information.

Or, the number M2 of bits of feedback information corresponding to each control information in the second HARQ-ACK subcodebook is equal to the third number C of bits of feedback information.

Or, the number M2 of bits of feedback information corresponding to each control information in the second HARQ-ACK subcodebook is equal to the fourth number D of bits of feedback information.

That is, the M2 may be determined based on the parameter configured by the network device, or, $M2=\max\{C, D\}$. Alternatively, if there is no value of C (e.g., not configured to use the control information to schedule the multiple physical channel transmissions), then $M2=D$. Alternatively, if there is no value of D (e.g., not configured to use the CBG transmission or the CBG feedback), then $M2=C$.

Here, the third number C of bits of feedback information is determined based on the maximum number of the physical channel transmissions scheduled by the first control information format. A first device is configured to use the first control information format on the first cell, to schedule the multiple physical channel transmissions. Here, on the first cell, one first control information format corresponds to C-bit feedback information.

In some embodiments, on the first cell, C=the maximum number of physical channels scheduled by the first control information format*the maximum number of TBs corresponding to each physical channel. For example, assuming that the first device is configured to use the maximum number of physical channels scheduled by the first control information format being 8 and the maximum number of TBs corresponding to each physical channel being 1, then C=8.

In some embodiments, on the first cell, assuming that the first device is configured to use the space division multiplexing feedback, C=the maximum number of physical channels scheduled by the first control information format.

In some embodiments, on the first cell, assuming that the first device is configured to use a time division multiplexing feedback, such as a multiplexing feedback for the multiple physical channels, C=ceil (the maximum number of physical channels scheduled by the first control information format/ the number of physical channels by the time division multiplexing feedback), where ceil represents rounding up. For example, assuming that the first device is configured to use the maximum number of physical channels scheduled by the first control information format being 7 and the number of physical channels by the time division multiplexing feedback being 2, then C=4. For another example, assuming that the first device is configured to use the maximum number of physical channels scheduled by the first control information format being 8 and the number of physical channels by the time division multiplexing feedback being 4, then C=2.

In some embodiments, the maximum number of physical channels scheduled by the first control information format is determined based on a Time Domain Resource Assignment (TDRA) table that the first device is configured to use.

In some embodiments, the maximum number of TBs corresponding to each physical channel is configured by the network device or preset. For example, under a condition that the maximum number of physical channels scheduled by the first control information format is greater than 1, a protocol may specify that the maximum number of TBs corresponding to each physical channel is 1.

In some embodiments, the number of physical channels by the time division multiplexing feedback is configured by the network device or preset. For example, under a condition that the maximum number of physical channels scheduled by the first control information format is greater than 4, the protocol may specify that the number of physical channels by the time division multiplexing feedback is 2. Alternatively, under a condition that the maximum number of physical channels scheduled by the first control information format is less than or equal to 4, the number of physical channels by the time division multiplexing feedback is 1.

In some embodiments, if the first cell includes multiple cells, then C is the maximum value of the values determined in the manner described above. C=max $\{C1, C2, \ldots\}$, where $C1$ is the number of bits of feedback information corresponding to one first control information format on the first cell 1; $C2$ is the number of bits of feedback information corresponding to one first control information format on the first cell 2, and so on. For example, assuming that the first cell includes the first cell 1 and the first cell 2, the number of bits of feedback information corresponding to one first control information format on the first cell 1 is 4, and the number of bits of feedback information corresponding to one first control information format on the first cell 2 is 6, then C=max $\{4, 6\}$=6.

Here, the fourth number D of bits of feedback information is determined based on the number of bits of feedback information of a CBG feedback corresponding to the first control information format. The first device is configured to use the CBG transmission and/or the CBG feedback on the second cell. On the second cell, at least one CBG is included in a TB of the physical channel scheduled by one first control information format, and one first control information format corresponds to D-bit feedback information.

In some embodiments, on the second cell, D=the maximum number of CBGs corresponding to each TB*the maximum number of TBs. For example, assuming that the first device is configured to use the maximum number of CBGs corresponding to each TB being 4 and the maximum number of TBs being 2, then D=8. For another example, assuming that the first device is configured to use the maximum number of CBGs corresponding to each TB being 4 and the maximum number of TBs being 1, then D=4.

In some embodiments, on the second cell, D=the maximum number of CBGs corresponding to each TB*the maximum number of TBs*the maximum number of physical channels scheduled by the first control information format. For example, assuming that the first device is configured to use the maximum number of CBGs corresponding to each TB being 4, the maximum number of TBs being 2, and the maximum number of physical channels scheduled by the first control information format being 2, then D=16. For another example, assuming that the first device is configured to use the maximum number of CBGs corresponding to each TB being 4, the maximum number of TBs being 1, and the maximum number of physical channels scheduled by the first control information format being 2, then D=8.

In some embodiments, if the second cell includes multiple cells, then D is the maximum value of the values determined in the manner described above. D=max $\{D1, D2, \ldots\}$, where D1=the maximum number of CBGs corresponding to each TB on the second cell 1*the maximum number of TBs on the second cell 1, D2=the maximum number of CBGs corresponding to each TB on the second cell 2*the maximum number of TBs on the second cell 2, and so on. For example, assuming that the second cell includes the second cell 1 and the second cell 2, the first device on the second cell 1 is configured to use the maximum number of CBGs corresponding to each TB being 4 and the maximum number of TBs being 2, and the first device on the second cell 2 is configured to use the maximum number of CBGs corresponding to each TB being 4 and the maximum number of TBs being 1, then D=max $\{4*2, 4*1\}$=8.

Alternatively, under a condition that the number Y of HARQ-ACK feedback bits corresponding to one piece of received control information included in the second HARQ-ACK subcodebook is less than the number M2 of bits of feedback information corresponding to each control information, the HARQ-ACK feedback bits are filled in the first Y bits of the M2 bits.

In some embodiments, the number of bits of feedback information corresponding to one piece of control information in the second HARQ-ACK subcodebook is M2, the CBG-based HARQ-ACK feedback includes HARQ-ACK feedback bits of D bits, and if D<M2, the first device maps the D bits into the first D bits of the M2 bits of feedback information.

In some embodiments, the number of feedback information bits corresponding to one piece of the control information in the second HARQ-ACK subcodebook is M2, the CBG-based HARQ-ACK feedback includes HARQ-ACK feedback bits of D bits, and if D<M2, the first device generates a NACK for each of the last (M2−D) bits of the M2 feedback information bits.

In some embodiments, the number of bits of feedback information corresponding to one piece of control information in the second HARQ-ACK subcodebook is M2, and under a condition that the first control information format is used to schedule the multiple physical channel transmissions, the number of bits of feedback information corresponding to one first control information format is C bits. If C<M2, the first device maps the C bits into the first C bits of the M2 bits of feedback information.

In some embodiments, the number of bits of feedback information corresponding to one piece of control information in the second HARQ-ACK subcodebook is M2, and under a condition that the first control information format is used to schedule the multiple physical channel transmissions the number of bits of feedback information corresponding to one first control information format is C bits. If C<M2, the first device generates a NACK for each of the last (M2−C) bits of the M2 bits of feedback information.

Here, a cascading manner of the first HARQ-ACK subcodebook and the second HARQ-ACK subcodebook will be described.

In one example, the first HARQ-ACK subcodebook and the second HARQ-ACK subcodebook are cascaded in the following order:

the first HARQ-ACK subcodebook and the second HARQ-ACK subcodebook; or, the second HARQ-ACK subcodebook and the first HARQ-ACK subcodebook.

Figure 5:
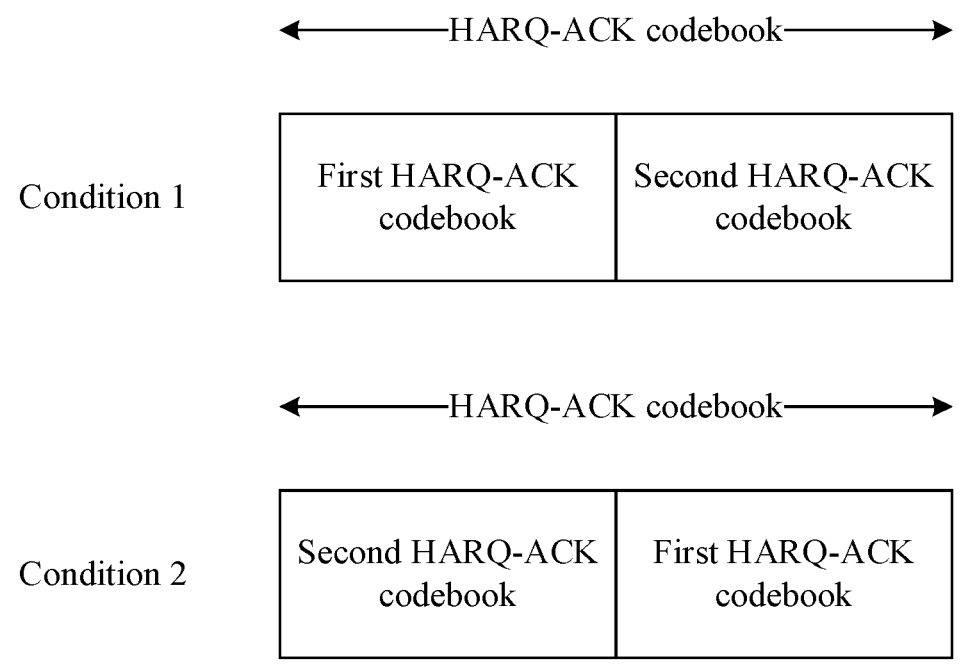
FIG. 5 is a schematic diagram of a HARQ-ACK codebook according to an embodiment of the disclosure.

Exemplarily, with reference to FIG. 5, the first HARQ-ACK subcodebook is located before the second HARQ-ACK subcodebook (as in the condition 1), or, the second HARQ-ACK subcodebook is located before the first HARQ-ACK subcodebook (as in the condition 2).

Alternatively, the first feedback resource is further used to carry feedback information of physical channel transmissions in a semi-persistent scheduling which is scheduled by no corresponding control information. The feedback information of the physical channel transmissions in the semi-persistent scheduling which is scheduled by no corresponding control information is cascaded with the first HARQ-ACK subcodebook and the second HARQ-ACK subcodebook.

That is, the feedback information of the physical channel transmissions in the semi-persistent scheduling which is scheduled by no corresponding control information does not belong to the first HARQ-ACK subcodebook or the second HARQ-ACK subcodebook.

In one example, the first HARQ-ACK subcodebook, the second HARQ-ACK subcodebook and the feedback information of the physical channel transmissions in the semi-persistent scheduling which is scheduled by no corresponding control information are cascaded in one of the following orders:

the first HARQ-ACK subcodebook, the second HARQ-ACK subcodebook, and the feedback information of the physical channel transmissions in the semi-persistent scheduling which is scheduled by no corresponding control information;

the second HARQ-ACK subcodebook, the feedback information of the physical channel transmissions in the semi-persistent scheduling which is scheduled by no corresponding control information, and the first HARQ-ACK subcodebook;

the feedback information of the physical channel transmissions in the semi-persistent scheduling which is scheduled by no corresponding control information, the first HARQ-ACK subcodebook, and the second HARQ-ACK subcodebook;

the first HARQ-ACK subcodebook, the feedback information of the physical channel transmissions in the semi-persistent scheduling which is scheduled by no corresponding control information, and the second HARQ-ACK subcodebook;

the feedback information of the physical channel transmissions in the semi-persistent scheduling which is scheduled by no corresponding control information, the second HARQ-ACK subcodebook, and the first HARQ-ACK subcodebook; or, the second HARQ-ACK subcodebook, the first HARQ-ACK subcodebook, and the feedback information of the physical channel transmissions in the semi-persistent scheduling which is scheduled by no corresponding control information.

Exemplarily, with reference to FIG. 6, the feedback information of the physical channel transmissions in the semi-persistent scheduling which is scheduled by no corresponding control information may be located after the first HARQ-ACK subcodebook, or after the second HARQ-ACK subcodebook, or before the first HARQ-ACK subcodebook, or before the second HARQ-ACK subcodebook.

Hereinafter, a condition that the first feedback resource includes a physical shared channel resource will be described.

In one example, the first feedback resource includes a physical shared channel resource, and the first feedback resource is scheduled by second control information. Under a condition that the first device is configured to use a CBG transmission and/or a CBG feedback on at least one cell, the second control information includes a first uplink DAI field and a second uplink DAI field. Here, the first uplink DAI field is used to determine the number of bits of feedback information included in the first HARQ-ACK subcodebook, and the second uplink DAI field is used to determine the number of bits of feedback information included in the second HARQ-ACK subcodebook.

Exemplarily, the first feedback resource includes a PUSCH resource. When the first device is supposed to transmit the HARQ-ACK codebook on a PUCCH transmission, if the PUCCH transmission and the PUSCH transmission of the first device overlap at least partially in the time domain, then the first device may multiplex the HARQ-ACK codebook to be transmitted onto the PUSCH for transmission. If the PUSCH is scheduled by the second control information, then the second control information (e.g., the DCI of the DCI format 0_1) may include the uplink DAI field.

If the first device is configured to use one piece of control information to schedule the multiple physical channel transmissions, the uplink DAI field includes the first uplink DAI field and the second uplink DAI field for determining sizes of the first HARQ-ACK subcodebook and the second HARQ-ACK subcodebook, respectively. By way of example and not limitation, the second HARQ-ACK subcodebook includes HARQ-ACK feedback information corresponding to the multiple physical channel transmissions scheduled by one piece of control information.

If the first device is configured to use the CBG transmission and/or the CBG feedback, the uplink DAI field includes the first uplink DAI field and the second uplink DAI field for determining the sizes of the first HARQ-ACK subcodebook and the second HARQ-ACK subcodebook, respectively. By way of example and not limitation, the second HARQ-ACK subcodebook includes HARQ-ACK feedback information corresponding to the physical channels of the CBG-based transmission and the CBG-based feedback.

If the first device is configured to use one piece of control information to schedule the multiple physical channel transmissions and the multiple physical channels are configured to use the CBG transmission and/or the CBG feedback, the uplink DAI field includes the first uplink DAI field and the second uplink DAI field for determining the sizes of the first HARQ-ACK subcodebook and the second HARQ-ACK subcodebook, respectively. By way of example and not limitation, the second HARQ-ACK subcodebook includes the HARQ-ACK feedback information corresponding to the multiple physical channel transmissions scheduled by one piece of control information and the HARQ-ACK feedback information corresponding to the physical channels of the CBG-based transmission and the CBG-based feedback.

Next, the counting manner for counting the HARQ-ACK subcodebook will be explained.

In some embodiments, the HARQ-ACK subcodebook is counted by using the C-DAI and/or T-DAI in the control information. For example, the first C-DAI is configured to determine the order of the bits of feedback information in the first HARQ-ACK subcodebook, and/or the first T-DAI is used to determine the number of bits of feedback information in the first HARQ-ACK subcodebook. As another example, the second C-DAI is used to determine the order of the bits of feedback information in the second HARQ-ACK subcodebook, and/or the second T-DAI is used to determine the number of bits of feedback information in the second HARQ-ACK subcodebook.

Alternatively, the T-DAI is not included in the control information of the second control information format.

Alternatively, the first C-DAI and/or the first T-DAI corresponds to the C-DAI and/or T-DAI included in the control information in at least one of the following conditions:

one or more physical channel transmissions scheduled by the first control information format;

a transmission of a physical channel scheduled by the first control information format and the physical channel corresponding to the TB feedback;

a transmission of a physical channel scheduled by the second control information format;

one or more activated physical channel transmissions in a semi-persistent scheduling by the first control information format or the second control information format;

here, under a condition that the one or more physical channel transmissions in the semi-persistent scheduling are activated by the first control information format, the maximum number of the activated physical channel transmissions in the semi-persistent scheduling within the semi-persistent transmission period is 1;

control information for releasing physical channel transmission(s) in the semi-persistent scheduling;

control information for indicating a Secondary Cell (SCell) dormancy of a SCell;

control information that is not associated with physical channel transmissions and is required to send feedback information.

Alternatively, the second C-DAI and/or the second T-DAI corresponds to the C-DAI and/or T-DAI included in the control information in at least one of the following conditions:

one or more physical channel transmissions scheduled by the first control information format;

multiple physical channel transmissions scheduled by the first control information format;

a transmission of a physical channel scheduled by the first control information format and the physical channel corresponding to the CBG feedback;

multiple physical channel transmissions scheduled by the first control information format and the multiple physical channels corresponding to the CBG feedback;

a transmission of a physical channel scheduled by the first control information format and the physical channel corresponding to the TB feedback;

one or more activated physical channel transmissions in a semi-persistent scheduling by the first control information format; here, the maximum number of the activated physical channel transmissions in the semi-persistent transmission period is not less than 2.

Hereinafter, an exemplary description for the method for codebook feedback in which the HARQ-ACK codebook includes two subcodebooks in the aforementioned Condition 1 will be provided in the following embodiments.

The terminal device is configured that cells 1 to 3 are service cells. On the cell 1, the DCI of the DCI format 1_1 configured for the terminal device may schedule multiple PDSCH receptions. Here, the maximum number of PDSCHs scheduled by the DCI format 1_1 may be determined as 6 according to the TDRA table configured for the terminal device, where each PDSCH corresponds to one TB. On the cell 2, PDSCH(s) scheduled by the DCI format 1_1 configured for the terminal device corresponds to a CBG transmission and/or a CBG feedback. Here, the maximum number of CBGs corresponding to each TB is 4 and the maximum number of TBs is 1. On the cell 3, the maximum number of TBs corresponding to the PDSCH(s) scheduled by the DCI format 1_1 configured for the terminal device is 2.

On the cell 1, the number of bits of feedback information corresponding to one DCI format 1_1 is C=6. On the cell 2, the number of bits of feedback information corresponding to one DCI format 1_1 is D=4. On the cell 3, the number of bits of feedback information corresponding to one DCI format 1_1 is A=2. For the cells 1 to 3, the number B of bits of feedback information corresponding to the PDSCHs scheduled by one DCI format 1_0 is 1 bit.

It is assumed that the first feedback resource corresponds to a set of PDCCH detection opportunities at time units 1 to 3. In the PDCCH detection opportunity at the time unit 1, the network device schedules four PDSCH transmissions (such as, PDSCHs 11 to 14) on the cell 1 through the DCI format 1_1, the network device schedules the PDSCH 21 transmission in the CBG manner on the cell 2 through the DCI format 1_1, and the network device further schedules the PDSCH 31 transmission in the TB manner on the cell 3 through the DCI format 1_1. In the PDCCH detection opportunity at the time unit 2, the network device schedules the PDSCH 41 (i.e., one PDSCH) transmission on the cell 1 through the DCI format 1_1 and the PDSCH 51 transmission on the cell 2 through the DCI format 1_0. In the PDCCH detection opportunity at the time unit 3, the network device schedules the PDSCH 61 transmission on the cell 1 through the DCI format 1_0 and the PDSCH 71 transmission on the cell 3 through the DCI format 1_0.

The HARQ-ACK codebook corresponding to the first feedback resource includes the first HARQ-ACK subcodebook and the second HARQ-ACK subcodebook.

Here, the first HARQ-ACK subcodebook includes feedback information corresponding to the following conditions:

one or more PDSCH transmissions scheduled by the DCI of the first DCI format (e.g., the DCI format 1_1);

one PDSCH transmission scheduled by the DCI of the first DCI format (e.g., the DCI format 1_1) and the PDSCH corresponding to a TB feedback;

one PDSCH transmission scheduled by the DCI of the second DCI format (e.g., the DCI format 1_0).

Here, the second HARQ-ACK subcodebook includes feedback information corresponding to the following conditions:

one or more PDSCH transmissions scheduled by the first DCI format (e.g., the DCI format 1_1);

multiple PDSCH transmissions scheduled by the first DCI format (e.g., the DCI format 1_1);

one PDSCH transmission scheduled by the DCI of the first DCI format (e.g., the DCI format 1_1) and the PDSCH corresponding to a CBG feedback.

Here, in the first HARQ-ACK subcodebook, the number of feedback bits corresponding to one DCI is $M1=\max \{2, 1\}=2$; and in the second HARQ-ACK subcodebook, the number of feedback bits corresponding to one DCI is $M2=\max \{6, 4\}=6$.

Figure 7:
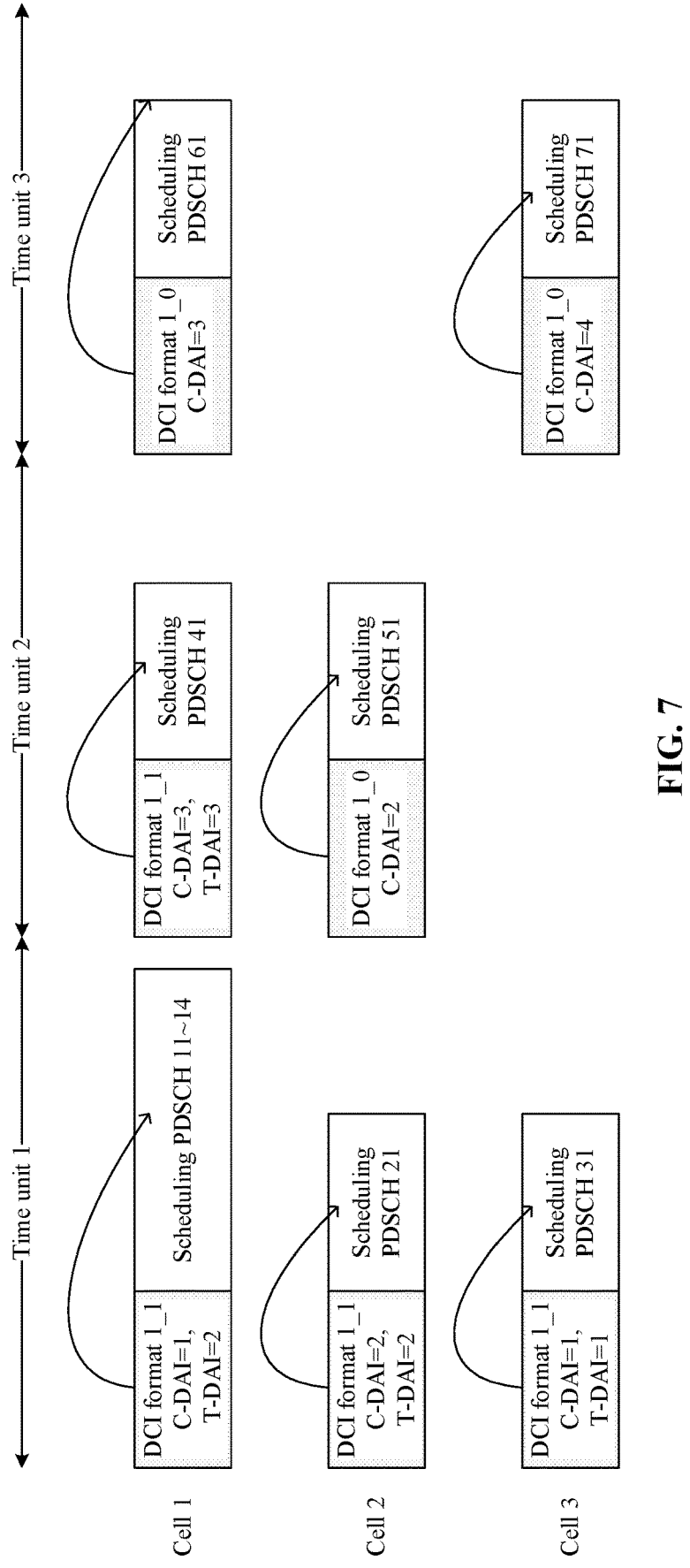
FIG. 7 is a schematic diagram of a DCI scheduling a downlink transmission according to an embodiment of the disclosure.

Exemplarily, the operation that the first DCI format (e.g., the DCI format 1_1) schedules the multiple PDSCH transmissions includes that: the maximum number of PDSCHs that can be scheduled by the first DCI format being greater than 1, where the first DCI format schedules one or more PDSCH transmissions. In the example, as shown in FIG. 7, in the PDCCH detection opportunity at the time unit 2, the feedback information corresponding to the PDSCH 41 (the PDSCH) transmission scheduled by the network device on the cell 1 through the DCI format 1_1 should be fed back through the second HARQ-ACK subcodebook.

le;.4qExemplarily, for the time unit 1: on the cell 1, the DCI for scheduling PDSCHs 11-14 corresponds to the DCI format 1_1 and further corresponds to the second HARQ-ACK subcodebook, here, the C-DAI in the DCI is 1, which means that the feedback information corresponding to the PDSCHs 11-14 scheduled by the DCI is ordered as 1 in the second HARQ-ACK subcodebook, and the T-DAI in the DCI is 2, which means that there are two DCIs corresponding to the second HARQ-ACK subcodebook at this time unit; on the cell 2, the DCI for scheduling PDSCH 21 corresponds to the DCI format 1_1 and further corresponds to the second HARQ-ACK subcodebook, here, the C-DAI in the DCI is 2, which means that the feedback information corresponding to the PDSCH 21 scheduled by the DCI is ordered as 2 in the second HARQ-ACK subcodebook, and the T-DAI in the DCI is 2, which means that there are two DCIs corresponding to the second HARQ-ACK subcodebook at this time unit; on the cell 3, the DCI for scheduling PDSCH 31 corresponds to the DCI format 1_1 and further corresponds to the first HARQ-ACK subcodebook, here, the C-DAI in the DCI is 1, which means that the feedback information corresponding to the PDSCH 31 scheduled by the DCI is ordered as 1 in the first HARQ-ACK subcodebook, and the T-DAI in the DCI is 2, which means that there is one DCI corresponding to the first HARQ-ACK subcodebook at this time unit.

In the example, the HARQ-ACK codebook fed back by the terminal device includes the following information:

| $1^{st}$ bit to $2^{nd}$ bit | $3^{rd}$ bit to $4^{th}$ bit | $5^{th}$ bit to $6^{th}$ bit | $7^{th}$ bit to $8^{th}$ bit |
|---|---|---|---|
| Feedback information corresponding to PDSCH 31 | Feedback information corresponding to PDSCH 51 | Feedback information corresponding to PDSCH 61 | Feedback information corresponding to PDSCH 71 |

| $9^{th}$ bit to $14^{th}$ bit | $15^{th}$ bit to $20^{th}$ bit | $21^{st}$ bit to $26^{th}$ bit |
|---|---|---|
| Feedback information corresponding to PDSCHs 11~14 | Feedback information corresponding to PDSCH 21 | Feedback information corresponding to PDSCH 41 |

Figure 8:
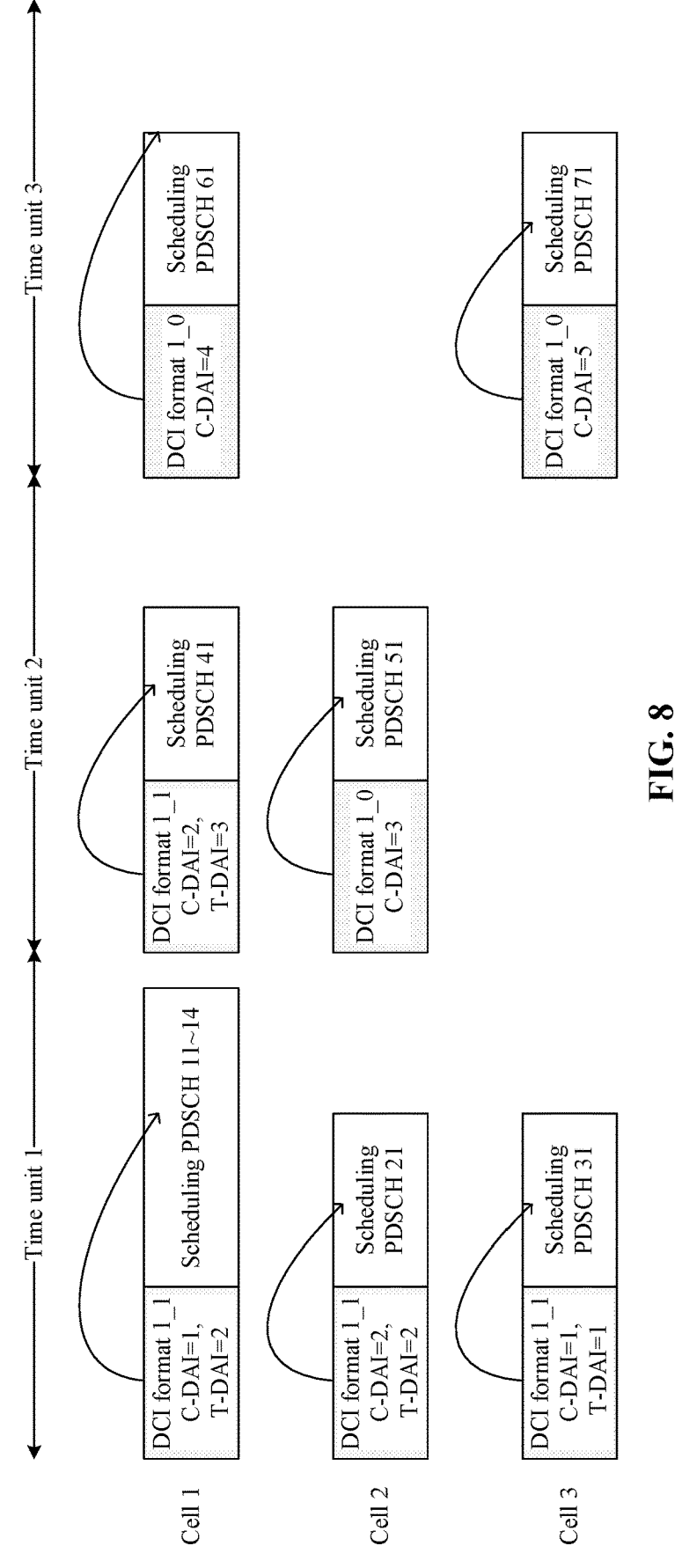
FIG. 8 is a schematic diagram of a DCI scheduling a downlink transmission according to an embodiment of the disclosure.

Exemplarily, the operation that the first DCI format (e.g., the DCI format 1_1) schedules the multiple PDSCH transmissions includes that: the maximum number of PDSCHs that can be scheduled by the first DCI format being greater than 1, and the first DCI format schedules the multiple PDSCH transmissions. Or, if the maximum number of PDSCHs that can be scheduled by the first DCI format is greater than 1 and the first DCI format schedules one PDSCH transmission, the feedback information corresponding to the one PDSCH transmission scheduled by the first DCI format should be fed back through the first HARQ-ACK subcodebook. In the example, as shown in FIG. 8, in the PDCCH detection opportunity at the time unit 2, the feedback information corresponding to the PDSCH 41 (the PDSCH) transmission scheduled by the network device on the cell 1 through the DCI format 1_1 should be fed back through the first HARQ-ACK subcodebook.

In the example, the HARQ-ACK codebook fed back by the terminal device includes the following information:

| $1^{st}$ bit to $2^{nd}$ bit | $3^{rd}$ bit to $4^{th}$ bit | $5^{th}$ bit to $6^{th}$ bit | $7^{th}$ bit to $8^{th}$ bit |
|---|---|---|---|
| Feedback information corresponding to PDSCH 31 | Feedback information corresponding to PDSCH 41 | Feedback information corresponding to PDSCH 51 | Feedback information corresponding to PDSCH 61 |

| $9^{th}$ bit to $10^{th}$ bit | $11^{th}$ bit to $16^{th}$ bit | $17^{th}$ bit to $22^{nd}$ bit |
|---|---|---|
| Feedback information corresponding to PDSCH 71 | Feedback information corresponding to PDSCHs 11~14 | Feedback information corresponding to PDSCH 21 |

To sum up, in the technical solutions according to the embodiments, the HARQ-ACK codebook includes two sub-codebooks, i.e., the first HARQ-ACK subcodebook and the second HARQ-ACK subcodebook. Since the number of bits of feedback information corresponding to each control information in the first HARQ-ACK subcodebook is different from the number of bits of feedback information corresponding to each control information in the second HARQ-ACK subcodebook, the feedback information corresponding to each type of control information is facilitated to use a reasonable number of bits of feedback information respectively for feedback, thereby reducing the overhead required for the codebook feedback.

Condition 2:

In some embodiments, the HARQ-ACK codebook carries feedback information corresponding to all control information which correspond to the same feedback time unit.

In some embodiments, the HARQ-ACK codebook is used to carry feedback information corresponding to at least one of the following control information.

The first control information is included, where the first control information schedules multiple physical channel transmissions; or schedules a transmission of a physical channel and the physical channel corresponds to a CBG feedback; or schedules a transmission of a physical channel and the physical channel corresponds to a TB feedback.

Control information of a first control information format on a second cell is included, where the control information of the first control information format on the second cell schedules a transmission of a physical channel and the physical channel corresponds to a CBG feedback.

Here, the first device is configured to use the first control information format on the second cell, and the first control information format on the second cell supports scheduling a transmission of a physical channel, and the physical channel corresponds to the CBG feedback.

Alternatively, the first cell and the second cell include the same cell. Alternatively, the first cell and the second cell include different cells.

Control information of a second control information format is included, where the control information of the second control information format schedules a transmission of a physical channel and the physical channel corresponds to a TB feedback.

In some embodiments of the disclosure, the control information corresponds to the multiple different control information formats, such as, a first control information format and a second control information format. The second control information format is a control information format different from the first control information format described above.

Exemplarily, the control information is a DCI, the first control information format is in a non-fallback mode (e.g., a DCI format 1_1), and the second control information format is in a fallback mode (e.g., a DCI format 1_0).

Control information of the first control information format on a third cell is included, where the control information of the first control information format on the third cell schedules a transmission of a physical channel and the physical channel corresponds to the TB feedback.

Here, the first device is configured to use the first control information format on the third cell, and the first control information format on the third cell does not support scheduling multiple physical channel transmissions, or does not support scheduling a transmission of a physical channel and the physical channel corresponding to the CBG feedback.

Alternatively, the first cell and the third cell include different cells.

Control information of a second control information format is included, where the control information of the second control information format is used to activate one or more physical channel transmissions in a semi-persistent scheduling.

Control information of the first control information format is included, where the control information of the first control information format is used to activate one or more physical channel transmissions in the semi-persistent scheduling. Here, the maximum number of the activated physical channel transmissions in the semi-persistent scheduling within the semi-persistent transmission period is 1.

Control information for releasing physical channel transmissions in the semi-persistent scheduling is included.

Control information for indicating a Secondary Cell (SCell) dormancy of a SCell is included.

Control information that is not associated with physical channel transmissions and is required to send feedback information is included.

In one example, the number M3 of bits of feedback information corresponding to each control information in the HARQ-ACK codebook is determined based on a third configuration parameter of the network device.

Or, the number M3 of bits of feedback information corresponding to each control information in the HARQ-ACK codebook is determined based on the maximum number of the physical channel transmissions scheduled by the first control information format.

In some embodiments, on the first cell, M3=the maximum number of the physical channels scheduled by the first control information format*the maximum number of TBs corresponding to each physical channel.

In some embodiments, on the first cell, assuming that the first device is configured to use the space multiplexing feedback, M3=the maximum number of the physical channels scheduled by the first control information format.

In some embodiments, on the first cell, assuming that the first device is configured to use a time division multiplexing feedback, such as a multiplexing feedback for the multiple physical channels, M3=ceil (the maximum number of physical channels scheduled by the first control information format/the number of physical channels by the time division multiplexing feedback), where ceil represents rounding up.

In some embodiments, the maximum number of physical channels scheduled by the first control information format is determined based on the TDRA table configured for the first device.

In some embodiments, the maximum number of TBs corresponding to each physical channel is configured by the network device or is preset. For example, under a condition that the maximum number of physical channels scheduled by the first control information format is greater than 1, the protocol may specify that the maximum number of TBs corresponding to each physical channel is 1.

In some embodiments, the number of physical channels by the time division multiplexing feedback is configured or preset by the network device. For example, under a condition that the maximum number of physical channels scheduled by the first control information format is greater than 4, the protocol may specify that the number of physical channels by the time division multiplexing feedback is 2. Alternatively, under a condition that the maximum number of physical channels scheduled by the first control information format is less than or equal to 4, the number of physical channels by the time division multiplexing feedback is 1.

In some embodiments, if the first cell includes multiple cells, then M3 is the maximum value of the values determined in the manner described above. For example, assuming that the first cell includes a first cell 1 and a first cell 2, the number of bits of feedback information corresponding to one first control information format on the first cell 1 is 4, and the number of bits of feedback information corresponding to one first control information format on the first cell 2 is 6, then M3=max {4, 6}=6.

To sum up, in the technical solutions provided by the embodiment, the HARQ-ACK codebook is a complete HARQ-ACK codebook, the number of bits of feedback information corresponding to each control information in the HARQ-ACK codebook is the same, and the number of bits of feedback information corresponding to each control information is determined based on the maximum number of the physical channel transmissions scheduled by the first control information format. In this way, the determined number of bits of feedback information corresponding to each control information is generally larger, which is beneficial to reducing the complexity of codebook feedback implementation and ensuring that the first device and the second device have consistent understanding of codebook length.

Condition 3:

In an exemplary embodiment, the HARQ-ACK codebook includes three subcodebooks, i.e., the first HARQ-ACK subcodebook, the second HARQ-ACK subcodebook, and a third HARQ-ACK subcodebook. The first feedback resource is used to feed back at least three sets of feedback information corresponding to the at least three sets of control information, and at least one set of the at least three sets of feedback information includes feedback information of the physical channel transmissions scheduled by the first control information.

In one example, the feedback information carried in the first HARQ-ACK subcodebook is the same as the feedback information carried in the first HARQ-ACK subcodebook described in the aforementioned condition 1, which will not be repeated here.

In one example, the second HARQ-ACK subcodebook carries the feedback information corresponding to at least one of the following control information.

Control information of a first control information format on a second cell is included, where the control information of the first control information format on the second cell schedules one or more transmissions of one or more physical channels, and the one or more physical channels correspond to the CBG feedback.

Here, the first device is configured to use the first control information format on the second cell, and the first control information format on the second cell supports scheduling a transmission of a physical channel, and the physical channel corresponds to the CBG feedback.

In one example, the third HARQ-ACK subcodebook carries the feedback information corresponding to at least one of the following control information:

control information (e.g., the first control information) of the first control information format on the first cell, where the first control information schedules the multiple physical channel transmissions and the physical channels correspond to the Transport Block (TB) feedback;

control information (e.g., the first control information) of the first control information format on the first cell, where the first control information schedules a transmission of a physical channel and the physical channel corresponds to the Transport Block (TB) feedback;

control information of the first control information format, where the control information of the first control information format is used to activate one or more physical channel transmissions in a semi-persistent scheduling (SPS), and the maximum number of the activated one or more physical channel transmissions in the semi-persistent scheduling within a semi-persistent transmission period is not less than 2.

In some embodiments, the first device is not expected to be simultaneously configured to use the CBG transmission and/or the CBG feedback, and be configured to use the maximum number of the physical channel transmissions scheduled by the first control information format being not less than 2.

In an exemplary embodiment, the first device is required to determine a control channel detection opportunity corresponding to the first feedback resource, and then sends the HARQ codebook through the first feedback resource to perform a feedback for the physical channel scheduled by the control information received in the control channel detection opportunity.

In one example, the first device determines the control channel detection opportunity based on first information, the first information including at least one of:

a time domain location of a last physical channel of one or more physical channels;

HARQ feedback timing set;

a time unit length, which is used to determine a time interval between first symbols of two consecutive control channel detection opportunities;

a time domain offset between the first control information format and a first physical channel in the one or more physical channels scheduled by the first control information format; or, a time domain offset between the first control information format and the last physical channel in the one or more physical channels scheduled by the first control information format;

here, the one or more physical channels is determined based on a TDRA table corresponding to the first control information format on the first cell.

It should be understood that the one or more physical channels refer to one or more physical channels configured for the first device, and are not identical to at least one physical channel scheduled by the first control information.

Alternatively, the time unit length includes one or more slots; or, the time unit length includes one or more slot groups; or, the time unit length includes multiple symbols.

Alternatively, the time unit length is used to determine a minimum time interval between the first symbols of two consecutive control channel detection opportunities.

Alternatively, the time unit length is used to determine the maximum value of the number of symbols between the first symbol and the last symbol in a single control channel monitoring time.

By way of example and not limitation, the control channel detection opportunity is a PDCCH detection opportunity corresponding to a duration combination (E, F), and the time unit length may be E or F. Here, E denotes the minimum time interval between the first symbols of two consecutive PDCCH monitoring time of the terminal device, and F denotes the maximum number of symbols between the first symbol and the last symbol monitored by the terminal device in one PDCCH monitoring time.

As another example, the time unit length is a length of any of the time units 1 to 3 in the example of FIG. 7 or FIG. 8.

To sum up, for the newly introduced scheduling manner of one piece of control information to schedule the multiple physical channels, the technical solutions according to the embodiments provide a method for determining the control channel detection opportunity of the corresponding feedback resource.

It should be understood that the aforementioned method embodiments may be implemented individually or in combination without limitation in the disclosure.

The following describes device embodiments of the disclosure, which can be used to implement the method embodiments of the disclosure. Details not disclosed in the device embodiments of the disclosure can be referred to the method embodiments of the disclosure.

Figure 9:
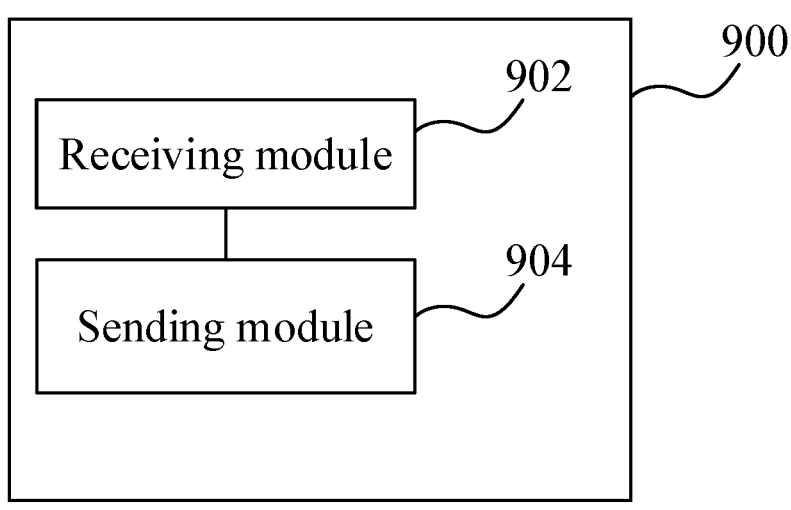
FIG. 9 is a schematic block diagram of an apparatus for codebook feedback according to an embodiment of the disclosure.

Referring to FIG. 9, FIG. 9 shows a schematic block diagram of an apparatus for codebook feedback according to an embodiment of the disclosure. The apparatus has the functions for implementing the method examples in the first device side described above. The functions of the apparatus can be implemented by the hardware, or implemented by the corresponding software executed by the hardware. The apparatus may be the first device described above or may be provided in the first device. As shown in FIG. 9, the apparatus 900 may include a receiving module 902 and a sending module 904.

The receiving module 902 is configured to receive first control information from a second device, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

The sending module 904 is configured to send the HARQ-ACK codebook on the first feedback resource.

In an alternative embodiment, the first feedback resource is used to feed back at least two sets of feedback information corresponding to at least two sets of control information, and at least one set of the at least two sets of feedback information includes feedback information of the physical channel transmission(s) scheduled by the first control information.

The sending module 904 is configured to send a first HARQ-ACK subcodebook and a second HARQ-ACK subcodebook on the first feedback resource, where the at least two sets of feedback information are respectively carried in the first HARQ-ACK subcodebook and the second HARQ-ACK subcodebook which are cascaded;

here, the number of bits of feedback information corresponding to each control information in the first HARQ-ACK subcodebook is less than the number of bits of feedback information corresponding to each control information in the second HARQ-ACK subcodebook.

In an alternative embodiment, under a condition that the first control information schedules multiple physical channel transmissions, feedback information corresponding to the first control information is carried in the second HARQ-ACK subcodebook, and the feedback information corresponding to the first control information includes HARQ-ACK information corresponding to the multiple physical channel transmissions.

In an alternative embodiment, under a condition that the first control information schedules a transmission of a physical channel and the physical channel corresponds to a CBG feedback, feedback information corresponding to the first control information is carried in the second HARQ-ACK subcodebook, and the feedback information corresponding to the first control information includes HARQ-ACK information of a CBG-based feedback corresponding to the transmission of the physical channel.

In an alternative embodiment, under a condition that the first control information schedules a transmission of a physical channel and the physical channel corresponds to a TB feedback, feedback information corresponding to the first control information is carried in the first HARQ-ACK subcodebook;

or, under a condition that the first control information schedules a transmission of a physical channel and the physical channel corresponds to a TB feedback, the feedback information corresponding to the first control information is carried in the second HARQ-ACK subcodebook;

or, under a condition that the number of bits of feedback information corresponding to the first control information is less than or equal to the number of bits of feedback information corresponding to each control information in the first HARQ-ACK subcodebook, the feedback information corresponding to the first control information is carried in the first HARQ-ACK subcodebook;

or, under a condition that the number of bits of feedback information corresponding to the first control information is greater than the number of bits of feedback information corresponding to each control information in the first HARQ-ACK subcodebook, the feedback information corresponding to the first control information is carried in the second HARQ-ACK subcodebook;

here, the feedback information corresponding to the first control information includes HARQ-ACK information of a TB-based feedback corresponding to the transmission of the physical channel which is scheduled by the first control information.

In an alternative embodiment, the second HARQ-ACK subcodebook is further used to carry feedback information corresponding to a first-type of control information, and the first type of control information includes at least one of:

control information of a first control information format on a second cell, where the control information of the first control information format on the second cell schedules a transmission of a physical channel and the physical channel corresponds to a CBG feedback;

control information of the first control information format on the second cell, where the number of bits of feedback information corresponding to the control information of the first control information format on the second cell is greater than the number of bits of feedback information corresponding to each control information in the first HARQ-ACK subcodebook; or control information of the first control information format, where the control information of the first control information format is used to activate one or more physical channel transmissions in a semi-persistent scheduling, and a maximum number of the activated physical channel transmissions in the semi-persistent scheduling within a semi-persistent transmission period is not less than 2.

In an alternative embodiment, the first HARQ-ACK subcodebook is used to carry feedback information corresponding to a second-type of control information, and the second-type of control information includes at least one of:

control information of a first control information format on a second cell, where the number of bits of feedback information corresponding to the control information of the first control information format on the second cell is less than or equal to the number of bits of feedback information corresponding to each control information in the first HARQ-ACK subcodebook;

control information of a second control information format, where the control information of the second control information format schedules a transmission of a physical channel and the physical channel corresponds to a TB feedback;

control information of a first control information format on a third cell, where the control information of the first control information format on the third cell schedules a transmission of a physical channel and the physical channel corresponds to a TB feedback;

control information of the second control information format, where the control information of the second control information format is used to activate one or more physical channel transmissions in a semi-persistent scheduling;

control information of the first control information format, where the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmission(s) in the semi-persistent scheduling;

control information for indicating a Secondary Cell (SCell) dormancy of a SCell; or control information that is not associated with physical channel transmissions and is required to send feedback information.

In an alternative embodiment, the number M1 of bits of feedback information corresponding to each control information in the first HARQ-ACK subcodebook is determined based on a first configuration parameter of a network device;

or, the number M1 of bits of feedback information corresponding to each control information in the first HARQ-ACK subcodebook is equal to a maximum value of a first number A of bits of feedback information and a second number B of bits of feedback information;

or, the number M1 of bits of feedback information corresponding to each control information in the first HARQ-ACK subcodebook is equal to a first number A of bits of feedback information;

or, the number M1 of bits of feedback information corresponding to each control information in the first HARQ-ACK subcodebook is equal to a second number B of bits of feedback information;

here, the first number A of bits of feedback information is determined based on the number of bits of feedback information corresponding to the first control information format on the third cell, and the second number B of bits of feedback information is 1.

In an alternative embodiment, under a condition that a number X of HARQ-ACK feedback bits corresponding to one piece of received control information included in the first HARQ-ACK subcodebook is less than the number M1 of bits of feedback information corresponding to each control information, the HARQ-ACK feedback bits are filled in first X bits of the M1 bits.

In an alternative embodiment, the number M2 of bits of feedback information corresponding to each control information in the second HARQ-ACK subcodebook is determined based on a second configuration parameter of a network device;

or, the number M2 of bits of feedback information corresponding to each control information in the second HARQ-ACK subcodebook is equal to a maximum value of a third number C of bits of feedback information and a fourth number D of bits of feedback information;

or, the number M2 of bits of feedback information corresponding to each control information in the second HARQ-ACK subcodebook is equal to a third number C of bits of feedback information;

or, the number M2 of bits of feedback information corresponding to each control information in the second HARQ-ACK subcodebook is equal to a fourth number D of bits of feedback information;

here, the third number C of bits of feedback information is determined based on a maximum number of physical channel transmissions scheduled by the first control information format, and the fourth number D of bits of feedback information is determined based on the number of bits of feedback information of a CBG feedback corresponding to the first control information format.

In an alternative embodiment, under a condition that a number Y of HARQ-ACK feedback bits corresponding to one piece of received control information included in the second HARQ-ACK subcodebook is less than the number M2 of bits of feedback information corresponding to each control information, the HARQ-ACK feedback bits are filled in first Y bits of the M2 bits.

In an alternative embodiment, the third number C of bits of feedback information is equal to a product of the maximum number of the physical channel transmissions scheduled by the first control information format and a maximum number of TBs corresponding to each of the physical channel transmissions;

or, under a condition that the apparatus is configured to use a space division multiplexing feedback, the third number C of bits of feedback information is equal to a maximum number of the physical channel transmissions scheduled by the first control information format;

or, under a condition that the apparatus is configured to use a time division multiplexing feedback, the third number C of bits of feedback information is equal to a value of rounding up a ratio of the maximum number of the physical channel transmissions scheduled by the first control information format to the number of time division multiplexing physical channels.

In an alternative embodiment, the first HARQ-ACK subcodebook and the second HARQ-ACK subcodebook are cascaded in the following order:

the first HARQ-ACK subcodebook and the second HARQ-ACK subcodebook; or, the second HARQ-ACK subcodebook and the first HARQ-ACK subcodebook.

In an alternative embodiment, the first feedback resource is further used to carry feedback information of physical channel transmissions in a semi-persistent scheduling which is scheduled by no corresponding control information;

here, the feedback information of the physical channel transmissions in the semi-persistent scheduling which is scheduled by no corresponding control information is cascaded with the first HARQ-ACK subcodebook and the second HARQ-ACK subcodebook.

In an alternative embodiment, the first HARQ-ACK subcodebook, the second HARQ-ACK subcodebook and the feedback information of the physical channel transmissions in the semi-persistent scheduling which is scheduled by no corresponding control information are cascaded in one of the following orders:

the first HARQ-ACK subcodebook, the second HARQ-ACK subcodebook, and the feedback information of the physical channel transmissions in the semi-persistent scheduling which is scheduled by no corresponding control information;

the second HARQ-ACK subcodebook, the feedback information of the physical channel transmissions in the semi-persistent scheduling which is scheduled by no corresponding control information, and the first HARQ-ACK subcodebook;

the feedback information of the physical channel transmissions in the semi-persistent scheduling which is scheduled by no corresponding control information, the first HARQ-ACK subcodebook, and the second HARQ-ACK subcodebook;

the first HARQ-ACK subcodebook, the feedback information of the physical channel transmissions in the semi-persistent scheduling which is scheduled by no corresponding control information, and the second HARQ-ACK subcodebook;

the feedback information of the physical channel transmissions in the semi-persistent scheduling which is scheduled by no corresponding control information, the second HARQ-ACK subcodebook, and the first HARQ-ACK subcodebook; or, the second HARQ-ACK subcodebook, the first HARQ-ACK subcodebook, and the feedback information of the physical channel transmissions in the semi-persistent scheduling which is scheduled by no corresponding control information.

In an alternative embodiment, the first feedback resource includes a physical shared channel resource, the first feedback resource is scheduled by second control information, the second control information includes a first uplink DAI field and a second uplink DAI field under a condition that the apparatus is configured to use a CBG transmission and/or a CBG feedback on at least one cell, the first uplink DAI field is used to determine the number of bits of feedback information included in the first HARQ-ACK subcodebook, and the second uplink DAI field is used to determine the number of bits of feedback information included in the second HARQ-ACK subcodebook.

In an alternative embodiment, the HARQ-ACK codebook is used to carry feedback information corresponding to at least one of the following control information:

the first control information, where the first control information schedules multiple physical channel transmissions; or schedules a transmission of a physical channel and the physical channel corresponds to a CBG feedback; or schedules a transmission of a physical channel and the physical channel corresponds to a TB feedback;

control information of a first control information format on a second cell, where the control information of the first control information format on the second cell schedules a transmission of a physical channel and the physical channel corresponds to a CBG feedback;

control information of a second control information format, where the control information of the second control information format schedules a transmission of a physical channel and the physical channel corresponds to a TB feedback;

control information of a first control information format on a third cell, where the control information of the first control information format on the third cell schedules a transmission of a physical channel and the physical channel corresponds to a TB feedback;

control information of the second control information format, where the control information of the second control information format is used to activate one or more physical channel transmissions in a semi-persistent scheduling;

control information of the first control information format, where the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmissions in the semi-persistent scheduling;

control information for indicating a Secondary Cell (SCell) dormancy of a SCell;

control information that is not associated with physical channel transmissions and is required to send feedback information.

In an alternative embodiment, the number M3 of bits of feedback information corresponding to each control information in the HARQ-ACK codebook is determined based on a third configuration parameter of a network device;

or, the number M3 of bits of feedback information corresponding to each control information in the HARQ-ACK codebook is determined based on a maximum number of physical channel transmissions scheduled by the first control information format.

In an alternative embodiment, the apparatus further includes a determination module for control channel detection opportunity.

The determination module for control channel detection opportunity is used to determine a control channel detection opportunity based on first information, the first information including at least one of:

a time domain location of a last physical channel of one or more physical channels;

a HARQ feedback timing set;

a time unit length, where the time unit length is used to determine a time interval between first symbols of two consecutive control channel detection opportunities;

a time domain offset between the first control information format and a first physical channel in the one or more physical channels scheduled by the first control information format; or a time domain offset between the first control information format and a last physical channel in the one or more physical channels scheduled by the first control information format;

here, the one or more physical channels is determined based on a TDRA table corresponding to the first control information format on the first cell.

In an alternative embodiment, the apparatus is a terminal, the second device is a network device, the physical channel includes a downlink physical channel, and the first feedback resource includes an uplink resource;

or, the apparatus is a first terminal, the second device is a second terminal, the physical channel includes a sidelink physical channel, and the first feedback resource includes a sidelink resource.

Figure 10:
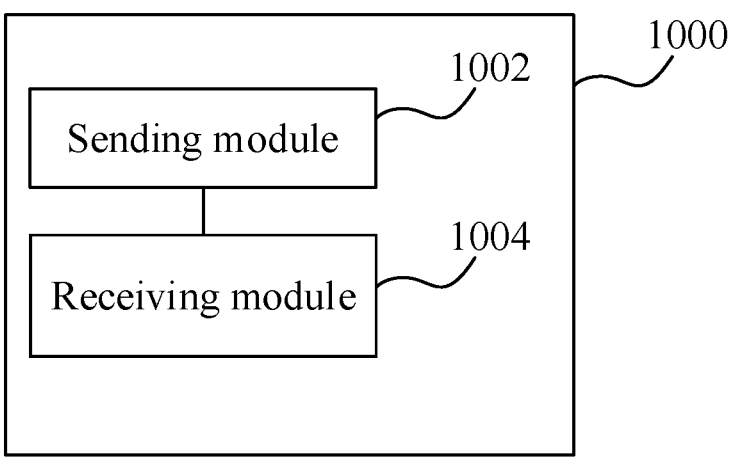
FIG. 10 is a schematic block diagram of an apparatus for codebook feedback according to an embodiment of the disclosure.

Referring to FIG. 10, FIG. 10 is a schematic block diagram of an apparatus for codebook feedback according to an embodiment of the disclosure. The apparatus has the functions for realizing the method examples in the second device side described above. The functions of the apparatus can be realized by the hardware, or realized by the corresponding software executed by the hardware. The apparatus may be the second device described above or may be provided in the second device. As shown in FIG. 10 the apparatus 1000 may include a sending module 1002 and a receiving module 1004.

The sending module 1002 is configured to send first control information to a first device, where the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

The receiving module 1004 is configured to receive the HARQ-ACK codebook on the first feedback resource.

In an alternative embodiment, the first feedback resource is used to feed back at least two sets of feedback information corresponding to at least two sets of control information, and at least one set of the at least two sets of feedback information includes feedback information of the physical channel transmission(s) scheduled by the first control information.

The receiving module 1004 is configured to receive a first HARQ-ACK subcodebook and a second HARQ-ACK sub codebook on the first feedback resource, where the at least two sets of feedback information are respectively carried in the first HARQ-ACK subcodebook and the second HARQ-ACK subcodebook which are cascaded;

here, the number of bits of feedback information corresponding to each control information in the first HARQ-ACK subcodebook is less than the number of bits of feedback information corresponding to each control information in the second HARQ-ACK sub-codebook.

In an alternative embodiment, under a condition that the first control information schedules multiple physical channel transmissions, feedback information corresponding to the first control information is carried in the second HARQ-ACK subcodebook, and the feedback information corresponding to the first control information includes HARQ-ACK information corresponding to the multiple physical channel transmissions.

In an alternative embodiment, under a condition that the first control information schedules a transmission of a physical channel and the physical channel corresponds to a CBG feedback, feedback information corresponding to the first control information is carried in the second HARQ-ACK subcodebook, and the feedback information corresponding to the first control information includes HARQ-ACK information of a CBG-based feedback corresponding to the transmission of the physical channel.

In an alternative embodiment, under a condition that the first control information schedules a transmission of a physical channel and the physical channel corresponds to a TB feedback, feedback information corresponding to the first control information is carried in the first HARQ-ACK subcodebook.

or, under a condition that the first control information schedules a transmission of a physical channel and the physical channel corresponds to a TB feedback, the feedback information corresponding to the first control information is carried in the second HARQ-ACK subcodebook;

or, under a condition that the number of bits of feedback information corresponding to the first control information is less than or equal to the number of bits of feedback information corresponding to each control information in the first HARQ-ACK subcodebook, the feedback information corresponding to the first control information is carried in the first HARQ-ACK subcodebook;

or, under a condition that the number of bits of feedback information corresponding to the first control information is greater than the number of bits of feedback information corresponding to each control information in the first HARQ-ACK subcodebook, the feedback information corresponding to the first control information is carried in the second HARQ-ACK subcodebook, here, the feedback information corresponding to the first control information includes HARQ-ACK information of a TB-based feedback corresponding to the transmission of the physical channel scheduled by the first control information.

In an alternative embodiment, the second HARQ-ACK subcodebook is further used to carry feedback information corresponding to a first-type of control information, and the first type of control information includes at least one of:

control information of a first control information format on a second cell, where the control information of the first control information format on the second cell schedules a transmission of a physical channel and the physical channel corresponds to a CBG feedback;

control information of the first control information format on the second cell, where the number of bits of feedback information corresponding to the control information of the first control information format on the second cell is greater than the number of bits of feedback information corresponding to each control information in the first HARQ-ACK subcodebook; or control information of the first control information format, where the control information of the first control information format is used to activate one or more physical channel transmissions in a semi-persistent scheduling, and a maximum number of the activated physical channel transmissions in the semi-persistent scheduling with a semi-persistent transmission period is not less than 2.

In an alternative embodiment, the first HARQ-ACK subcodebook is used to carry feedback information corresponding to a second-type of control information, and the second-type of control information includes at least one of:

control information of a first control information format on a second cell, where the number of bits of feedback information corresponding to the control information of the first control information format on the second cell is less than or equal to the number of bits of feedback information corresponding to each control information in the first HARQ-ACK subcodebook;

control information of a second control information format, where the control information of the second control information format schedules a transmission of a physical channel and the physical channel corresponds to a TB feedback;

control information of a first control information format on a third cell, where the control information of the first control information format on the third cell schedules a transmission of a physical channel and the physical channel corresponds to a TB feedback;

control information of the second control information format, where the control information of the second control information format is used to activate one or more physical channel transmissions in a semi-persistent scheduling;

control information of the first control information format, where the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmissions in the semi-persistent scheduling;

control information for indicating a Secondary Cell (SCell) dormancy of a SCell; or control information that is not associated with physical channel transmissions and is required to send feedback information.

In an alternative embodiment, the number M1 of bits of feedback information corresponding to each control information in the first HARQ-ACK subcodebook is determined based on a first configuration parameter of a network device;

or, a number M1 of bits of feedback information corresponding to each control information in the first HARQ-ACK subcodebook is equal to a maximum value of a first number A of bits of feedback information and a second number B of bits of feedback information;

or, a number M1 of bits of feedback information corresponding to each control information in the first HARQ-ACK subcodebook is equal to a first number A of bits of feedback information;

or, a number M1 of bits of feedback information corresponding to each control information in the first HARQ-ACK subcodebook is equal to a second number B of bits of feedback information;

here, the first number A of bits of feedback information is determined based on the number of bits of feedback information corresponding to the first control information format on the third cell, and the second number B of bits of feedback information is 1.

In an alternative embodiment, under a condition that a number X of HARQ-ACK feedback bits corresponding to one piece of received control information included in the first HARQ-ACK subcodebook is less than the number M1 of bits of feedback information corresponding to each control information, the HARQ-ACK feedback bits are filled in first X bits of the M1 bits.

In an alternative embodiment, a number M2 of bits of feedback information corresponding to each control information in the second HARQ-ACK subcodebook is determined based on a second configuration parameter of a network device;

or, a number M2 of bits of feedback information corresponding to each control information in the second HARQ-ACK subcodebook is equal to a maximum value of a third number C of bits of feedback information and a fourth number D of bits of feedback information;

or, a number M2 of bits of feedback information corresponding to each control information in the second HARQ-ACK subcodebook is equal to a third number C of bits of feedback information;

or, a number M2 of bits of feedback information corresponding to each control information in the second HARQ-ACK subcodebook is equal to a fourth number D of bits of feedback information;

here, the third number C of bits of feedback information is determined based on a maximum number of physical channel transmissions scheduled by the first control information format, and the fourth number D of bits of feedback information is determined based on the number of bits of feedback information of a CBG feedback corresponding to the first control information format.

In an alternative embodiment, under a condition that a number Y of HARQ-ACK feedback bits corresponding to one piece of received control information included in the second HARQ-ACK subcodebook is less than the number M2 of bits of feedback information corresponding to each control information, the HARQ-ACK feedback bits are filled in first Y bits of the M2 bits.

In an alternative embodiment, the third number C of bits of feedback information is equal to a product of the maximum number of the physical channel transmissions scheduled by the first control information format and a maximum number of TBs corresponding to each of the physical channel transmissions;

or, under a condition that the first device is configured to use a space division multiplexing feedback, the third number C of bits of feedback information is equal to a maximum number of the physical channel transmissions scheduled by the first control information format;

or, under a condition that the first device is configured to use a time division multiplexing feedback, the third number C of bits of feedback information is equal to a value of rounding up a ratio of the maximum number of the physical channel transmissions scheduled by the first control information format to the number of time division multiplexing physical channels.

In an alternative embodiment, the first HARQ-ACK subcodebook and the second HARQ-ACK subcodebook are cascaded in the following order:

the first HARQ-ACK subcodebook and the second HARQ-ACK subcodebook; or, the second HARQ-ACK subcodebook and the first HARQ-ACK subcodebook.

In an alternative embodiment, the first feedback resource is further used to carry feedback information of physical channel transmissions in a semi-persistent scheduling which is scheduled by no corresponding control information;

here, the feedback information of the physical channel transmissions in the semi-persistent scheduling which is scheduled by no corresponding control information is cascaded with the first HARQ-ACK subcodebook and the second HARQ-ACK subcodebook.

In an alternative embodiment, the first HARQ-ACK subcodebook, the second HARQ-ACK subcodebook and the feedback information of the physical channel transmissions in the semi-persistent scheduling which is scheduled by no corresponding control information are cascaded in one of the following orders:

the first HARQ-ACK subcodebook, the second HARQ-ACK subcodebook, and the feedback information of the physical channel transmissions in the semi-persistent scheduling which is scheduled by no corresponding control information;

the second HARQ-ACK subcodebook, the feedback information of the physical channel transmissions in the semi-persistent scheduling which is scheduled by no corresponding control information, and the first HARQ-ACK subcodebook;

the feedback information of the physical channel transmissions in the semi-persistent scheduling which is scheduled by no corresponding control information, the first HARQ-ACK subcodebook, and the second HARQ-ACK subcodebook;

the first HARQ-ACK subcodebook, the feedback information of the physical channel transmissions in the semi-persistent scheduling which is scheduled by no corresponding control information, and the second HARQ-ACK subcodebook;

the feedback information of the physical channel transmissions in the semi-persistent scheduling which is scheduled by no corresponding control information, the second HARQ-ACK subcodebook, and the first HARQ-ACK subcodebook; or, the second HARQ-ACK subcodebook, the first HARQ-ACK subcodebook, and the feedback information of the physical channel transmissions in the semi-persistent scheduling which is scheduled by no corresponding control information.

In an alternative embodiment, the first feedback resource includes a physical shared channel resource, the first feedback resource is scheduled by second control information, the second control information includes a first uplink DAI field and a second uplink DAI field under a condition that the first device is configured to use a CBG transmission and/or a CBG feedback on at least one cell, the first uplink DAI field is used to determine the number of bits of feedback information included in the first HARQ-ACK subcodebook, and the second uplink DAI field is used to determine the number of bits of feedback information included in the second HARQ-ACK subcodebook.

In an alternative embodiment, the HARQ-ACK codebook is used to carry feedback information corresponding to at least one of the following control information:

the first control information, where the first control information schedules multiple physical channel transmissions; or schedules a transmission of a physical channel and the physical channel corresponds to a CBG feedback; or schedules a transmission of a physical channel and the physical channel corresponds to a TB feedback;

control information of a first control information format on a second cell, where the control information of the first control information format on the second cell schedules a transmission of a physical channel and the physical channel corresponds to a CBG feedback;

control information of a second control information format, where the control information of the second control information format schedules a transmission of a physical channel and the physical channel corresponds to a TB feedback;

control information of a first control information format on a third cell, where the control information of the first control information format on the third cell schedules a transmission of a physical channel and the physical channel corresponds to a TB feedback;

control information of the second control information format, where the control information of the second control information format is used to activate one or more physical channel transmissions in a semi-persistent scheduling;

control information of the first control information format, where the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmissions in the semi-persistent scheduling;

control information for indicating a Secondary Cell (SCell) dormancy of a SCell;

control information that is not associated with physical channel transmissions and is required to send feedback information.

In an alternative embodiment, a number M3 of bits of feedback information corresponding to each control information in the HARQ-ACK codebook is determined based on a third configuration parameter of a network device;

or, a number M3 of bits of feedback information corresponding to each control information in the HARQ-ACK codebook is determined based on a maximum number of physical channel transmissions scheduled by the first control information format.

In an alternative embodiment, the first device is a terminal, the apparatus is a network device, the physical channel includes a downlink physical channel, and the first feedback resource includes an uplink resource;

or, the first device is a first terminal, the apparatus is a second terminal, the physical channel includes a sidelink physical channel, and the first feedback resource includes a sidelink resource.

It should be noted that when the apparatus provided in the aforementioned embodiments implements its functions, only the division of each aforementioned function module is given as an example. In practical applications, the aforementioned functions can be assigned by different functional modules according to actual needs; that is, the content structure of the device is divided into different function modules to complete all or part of the functions described above.

With regard to the apparatus in the above embodiments, the specific manner in which each module performs an operation has been described in detail in the embodiments relating to the method and will not be elaborated herein.

Figure 11:
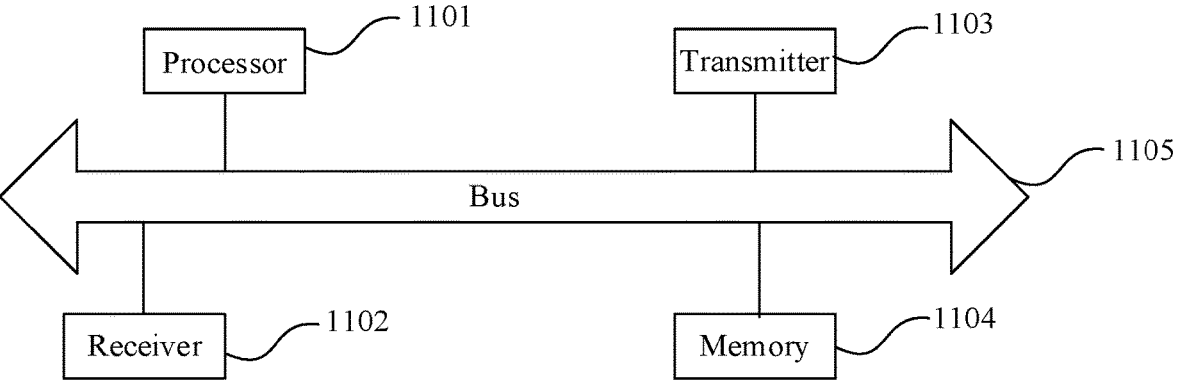
FIG. 11 is a schematic structural diagram of a communication device according to an embodiment of the disclosure.

Referring to FIG. 11, FIG. 11 shows a schematic structural diagram of a communication device (e.g., the terminal device or the network device) according to an embodiment of the disclosure. The communication device may include a processor 1101, a receiver 1102, a transmitter 1103, a memory 1104 and a bus 1105.

The processor 1101 includes one or more processing cores, and executes various functional applications and codebook feedback by running software programs and modules.

The receiver 1102 and the transmitter 1103 may be implemented as a transceiver 1106 which may be a communication chip.

The memory 1104 is connected to the processor 1101 through the bus 1105.

The memory 1104 may be configured to store a computer program, and the processor 1101 may be configured to execute the computer program, to implement various operations performed by the terminal device in the aforementioned method embodiments.

In addition, the memory 1104 may be implemented by any type of a volatile storage device or a non-volatile storage device, or a combination thereof. The volatile storage device or the non-volatile storage device includes but not limited to: a Random-Access Memory (RAM) and a Read-Only Memory (ROM), an Erasable Programmable Read-Only Memory (EPROM), an Electrically Erasable Programmable Read-Only Memory (EEPROM), a flash memory or other solid-state storage technologies, a Compact Disc Read-Only Memory (CD-ROM), a Digital Video Disc (DVD, high density digital video disc) or other optical storages, a cassette storage, a magnetic tape storage, a magnetic disk storage or other magnetic storage devices.

Here, when the communication device is implemented as the first device, the processor and the transceiver according to the embodiments of the disclosure can perform the operations performed by the first device in the method shown in any of the aforementioned embodiments, which will not be elaborated herein In one possible implementation, when the communication device is implemented as the first device.

The transceiver is configured to receive first control information from a second device, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

The transceiver is configured to send the HARQ-ACK codebook on the first feedback resource.

Here, when the communication device is implemented as the second device, the processor and the transceiver according to the embodiment of the disclosure can perform the operations performed by the second device in the method shown in any of the aforementioned embodiments, which will not be elaborated here.

In one possible implementation, when the communication device is implemented as the second device.

The transceiver is configured to send first control information to a first device, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a HARQ-ACK codebook, and the HARQ-ACK codebook corresponds to a first feedback resource.

The transceiver is configured to receive the HARQ-ACK codebook on the first feedback resource.

Embodiments of the disclosure further provide a computer-readable storage medium in which a computer program is stored, and the computer program is used to be executed by a processor to implement the method for codebook feedback.

Alternatively, the computer-readable storage medium may include a Read-Only Memory (ROM), a Random-Access Memory (RAM), a Solid State Drive (SSD), an optical disk, or the like. The random access memory includes a Resistance Random Access Memory (ReRAM) and a Dynamic Random Access Memory (DRAM).

Embodiments of the disclosure further provide a chip, where the chip includes programmable logic circuitry and/or a program instruction; when the chip is running, the chip is used to implement the method for codebook feedback.

Embodiments of the disclosure further provide a computer program product or computer program, the computer program product or computer program including computer instructions stored in a computer-readable storage medium from which a processor reads and executes the computer instructions to implement the method for codebook feedback.

It should be understood that the terms "system" and "network" are generally used interchangeably herein.

It should be understood that the referred term "indication" in embodiments of the disclosure may be a direct indication an indirect indication, or, may be used to indicate an association. For example, A indicates B, which can mean that A directly indicates B, for example, B can be obtained through A. It can further mean that A indirectly indicates B, for example, A indicates C, and B can be obtained by C. It can further indicate that there is an association between A and B.

In the description of embodiments of the disclosure, the term "corresponding" may mean that there is a direct correspondence or an indirect correspondence relationship between two objects, may further mean that there is an association relationship between the two objects, may further be a relationship between the indication and the object to be indicated, or, the configuration and the object to be configured, etc.

In the embodiments of the disclosure, the term "predefined" or "pre-configured" may be achieved by pre-storing corresponding codes, tables, or other means that may be used to indicate relevant information in devices (e.g., including the terminal device and the network devices, the specific implementation of which is not limited herein. For example, the term "predefined" can refer to what is defined in the protocol.

In embodiments of the disclosure, the "protocol" may refer to a standard protocol in the communication field, for example, may include an LTE protocol, an NR protocol, and related protocols applied in future communication systems, which are not limited in the present disclosure.

In the present disclosure, the term "multiple" refers to two or more. The term "and/or", which describes the association relationship of the associated objects, means that there can be three relationships. For example, A and/or B can mean that there are three situations: A alone, A and B at the same time, and B alone. The character "/" generally indicates that the related objects are in an "or" relationship.

In addition, the numbering of the operations described herein only exemplifies a possible sequence of execution between the operations. In some other embodiments, the above operations may also be performed in a different numbering sequence; for example, two different numbered operations are performed simultaneously, or, two different numbered operations are performed in the reverse sequence to the illustration, which will not be limited by the embodiments of the disclosure.

Those skilled in the art will appreciate that, in one or more of the aforementioned examples, the functions described in the embodiments of the disclosure may be implemented in hardware, software, firmware or any combination thereof. When being implemented in the software, these functions may be stored in a computer-readable medium or transmitted as one or more instructions or codes on the computer-readable medium. The computer-readable medium includes a computer storage medium and a communication medium, where the communication medium includes any medium that facilitates the transfer of the computer program from one place to another place. The storage medium may be any available medium accessible to a general-purpose computer or a special-purpose computer.

The above description is only exemplary embodiments of the disclosure and is not intended to limit the present disclosure. Any modification, equivalent replacement, improvement, etc. made within the spirit and principles of the disclosure shall be included in the scope of protection of the disclosure.

What is claimed is:

1. A method for codebook feedback, comprising:

receiving, by a first device, first control information from a second device, wherein the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a Hybrid Automatic Repeat Request-Acknowledgement (HARQ-ACK) codebook, and the HARQ-ACK codebook corresponds to a first feedback resource;

sending, by the first device, the HARQ-ACK codebook on the first feedback resource;

wherein sending, by the first device, the HARQ-ACK codebook on the first feedback resource, comprises:

sending, by the first device on the first feedback resource, a first HARQ-ACK subcodebook and a second HARQ-ACK subcodebook that are cascaded;

wherein the first HARQ-ACK subcodebook is used to carry feedback information corresponding to control information that is not associated with physical channel transmissions and is required to send feedback information.

2. The method of claim 1, wherein the first feedback resource is used to feed back at least two sets of feedback information corresponding to at least two sets of control information, and at least one set of the at least two sets of feedback information comprises feedback information of the at least one physical channel transmission scheduled by the first control information;

wherein the at least two sets of feedback information are respectively carried in the first HARQ-ACK subcodebook and the second HARQ-ACK subcodebook;

wherein a number of bits of feedback information corresponding to each control information in the first HARQ-ACK subcodebook is less than a number of bits of feedback information corresponding to each control information in the second HARQ-ACK subcodebook.

3. The method of claim 1, wherein under a condition that the first control information schedules a plurality of physical channel transmissions, feedback information corresponding to the first control information is carried in the second HARQ-ACK subcodebook, and the feedback information corresponding to the first control information comprises HARQ-ACK information corresponding to the plurality of physical channel transmissions.

4. The method of claim 1, wherein under a condition that the first control information schedules a transmission of a physical channel and the physical channel corresponds to a Transport Block (TB) feedback, feedback information corresponding to the first control information is carried in the first HARQ-ACK subcodebook;

or under a condition that the first control information schedules a transmission of a physical channel and the physical channel corresponds to a Transport Block (TB) feedback, the feedback information corresponding to the first control information is carried in the second HARQ-ACK subcodebook;

or under a condition that a number of bits of feedback information corresponding to the first control information is less than or equal to the number of bits of feedback information corresponding to each control information in the first HARQ-ACK subcodebook, the feedback information corresponding to the first control information is carried in the first HARQ-ACK subcodebook;

or under a condition that a number of bits of feedback information corresponding to the first control information is greater than the number of bits of feedback information corresponding to each control information in the first HARQ-ACK subcodebook, the feedback information corresponding to the first control information is carried in the second HARQ-ACK subcodebook;

wherein the feedback information corresponding to the first control information comprises HARQ-ACK information of a TB-based feedback corresponding to the transmission of the physical channel which is scheduled by the first control information.

5. The method of claim 1, wherein the first HARQ-ACK subcodebook is further used to carry feedback information corresponding to at least one of the following control information:

control information of a first control information format on a second cell, wherein a number of bits of feedback information corresponding to the control information of the first control information format on the second cell is less than or equal to the number of bits of feedback information corresponding to each control information in the first HARQ-ACK subcodebook;

control information of a second control information format, wherein the control information of the second control information format schedules a transmission of a physical channel and the physical channel corresponds to a TB feedback;

control information of a first control information format on a third cell, wherein the control information of the first control information format on the third cell schedules a transmission of a physical channel and the physical channel corresponds to a TB feedback;

control information of the second control information format, wherein the control information of the second control information format is used to activate one or more physical channel transmissions in a semi-persistent scheduling;

control information of the first control information format, wherein the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmissions in the semi-persistent scheduling;

control information for indicating a Secondary Cell (SCell) dormancy of a SCell.

6. The method of claim 1, wherein a number M1 of bits of feedback information corresponding to each control information in the first HARQ-ACK subcodebook is determined based on a first configuration parameter of a network device;

or a number M1 of bits of feedback information corresponding to each control information in the first HARQ-ACK subcodebook is equal to a maximum value of a first number A of bits of feedback information and a second number B of bits of feedback information;

or a number M1 of bits of feedback information corresponding to each control information in the first HARQ-ACK subcodebook is equal to a first number A of bits of feedback information;

or a number M1 of bits of feedback information corresponding to each control information in the first HARQ-ACK subcodebook is equal to a second number B of bits of feedback information;

wherein the first number A of bits of feedback information is determined based on a number of bits of feedback information corresponding to the first control information format on the third cell, and the second number B of bits of feedback information is 1;

wherein under a condition that a number X of HARQ-ACK feedback bits corresponding to one piece of received control information included in the first HARQ-ACK subcodebook is less than the number M1 of bits of feedback information corresponding to each control information, the HARQ-ACK feedback bits are filled in first X bits of the M1 bits.

7. The method of claim 1, wherein a number M2 of bits of feedback information corresponding to each control information in the second HARQ-ACK subcodebook is determined based on a second configuration parameter of a network device;

or a number M2 of bits of feedback information corresponding to each control information in the second HARQ-ACK subcodebook is equal to a maximum value of a third number C of bits of feedback information and a fourth number D of bits of feedback information;

or a number M2 of bits of feedback information corresponding to each control information in the second HARQ-ACK subcodebook is equal to a third number C of bits of feedback information;

or a number M2 of bits of feedback information corresponding to each control information in the second HARQ-ACK subcodebook is equal to a fourth number D of bits of feedback information;

wherein the third number C of bits of feedback information is determined based on a maximum number of physical channel transmissions scheduled by the first control information format, and the fourth number D of bits of feedback information is determined based on a number of bits of feedback information of a CBG feedback corresponding to the first control information format.

8. The method of claim 7, wherein under a condition that a number Y of HARQ-ACK feedback bits corresponding to one piece of received control information included in the second HARQ-ACK subcodebook is less than the number M2 of bits of feedback information corresponding to each control information, the HARQ-ACK feedback bits are filled in first Y bits of the M2 bits.

9. The method of claim 7, wherein the third number C of bits of feedback information is equal to a product of the maximum number of the physical channel transmissions scheduled by the first control information format and a maximum number of TBs corresponding to each of the physical channel transmissions;

or under a condition that the first device is configured to use a space division multiplexing feedback, the third number C of bits of feedback information is equal to a maximum number of the physical channel transmissions scheduled by the first control information format;

or under a condition that the first device is configured to use a time division multiplexing feedback, the third number C of bits of feedback information is equal to a value of rounding up a ratio of the maximum number of the physical channel transmissions scheduled by the first control information format to a number of time division multiplexing physical channels.

10. The method of claim 1, wherein the first feedback resource is further used to carry feedback information of physical channel transmissions in a semi-persistent scheduling which is scheduled by no corresponding control information;

wherein the feedback information of the physical channel transmissions in the semi-persistent scheduling which is scheduled by no corresponding control information is cascaded with the first HARQ-ACK subcodebook and the second HARQ-ACK subcodebook;

wherein the first HARQ-ACK subcodebook, the second HARQ-ACK subcodebook and the feedback information of the physical channel transmissions in the semi-persistent scheduling which is scheduled by no corresponding control information are cascaded in one of the following orders:

the first HARQ-ACK subcodebook, the second HARQ-ACK subcodebook, and the feedback information of the physical channel transmissions in the semi-persistent scheduling which is scheduled by no corresponding control information;

the second HARQ-ACK subcodebook, the feedback information of the physical channel transmissions in the semi-persistent scheduling which is scheduled by no corresponding control information, and the first HARQ-ACK subcodebook;

the feedback information of the physical channel transmissions in the semi-persistent scheduling which is scheduled by no corresponding control information, the first HARQ-ACK subcodebook, and the second HARQ-ACK subcodebook;

the first HARQ-ACK subcodebook, the feedback information of the physical channel transmissions in the semi-persistent scheduling which is scheduled by no corresponding control information, and the second HARQ-ACK subcodebook;

the feedback information of the physical channel transmissions in the semi-persistent scheduling which is scheduled by no corresponding control information, the second HARQ-ACK subcodebook, and the first HARQ-ACK subcodebook; or the second HARQ-ACK subcodebook, the first HARQ-ACK subcodebook, and the feedback information of the physical channel transmissions in the semi-persistent scheduling which is scheduled by no corresponding control information.

11. The method of claim 1, wherein a number M3 of bits of feedback information corresponding to each control information in the HARQ-ACK codebook is determined based on a third configuration parameter of a network device;

or a number M3 of bits of feedback information corresponding to each control information in the HARQ-ACK codebook is determined based on a maximum number of physical channel transmissions scheduled by the first control information format.

12. The method of claim 1, wherein the method further comprises:

determining a control channel detection opportunity based on first information, the first information comprising at least one of:

a time domain location of a last physical channel of one or more physical channels;

a HARQ feedback timing set;

a time unit length, wherein the time unit length is used to determine a time interval between first symbols of two consecutive control channel detection opportunities;

a time domain offset between the first control information format and a first physical channel in the one or more physical channels scheduled by the first control information format; or a time domain offset between the first control information format and a last physical channel in the one or more physical channels scheduled by the first control information format;

wherein the one or more physical channels is determined based on a Time Domain Resource Assignment (TDRA) table corresponding to the first control information format on the first cell.

13. The method of claim 1, wherein the first device is a terminal, the second device is a network device, the physical channel comprises a downlink physical channel, and the first feedback resource comprises an uplink resource;

or the first device is a first terminal, the second device is a second terminal, the physical channel comprises a sidelink physical channel, and the first feedback resource comprises a sidelink resource.

14. A method for codebook feedback, comprising:

sending, by the second device, first control information to a first device, wherein the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a Hybrid Automatic Repeat Request-Acknowledgement (HARQ-ACK) codebook, and the HARQ-ACK codebook corresponds to a first feedback resource;

receiving, by the second device, the HARQ-ACK codebook on the first feedback resource;

wherein receiving, by the second device, the HARQ-ACK codebook on the first feedback resource, comprising:

receiving, by the second device on the first feedback resource, a first HARQ-ACK subcodebook and a second HARQ-ACK subcodebook that are cascaded;

wherein the first HARQ-ACK subcodebook is used to carry feedback information corresponding to control information that is not associated with physical channel transmissions and is required to send feedback information.

15. The method of claim 14, wherein the first feedback resource is used to feed back at least two sets of feedback information corresponding to at least two sets of control information, and at least one set of the at least two sets of feedback information comprises feedback information of the at least one physical channel transmission scheduled by the first control information;

wherein the at least two sets of feedback information are respectively carried in the first HARQ-ACK subcodebook and the second HARQ-ACK subcodebook;

wherein a number of bits of feedback information corresponding to each control information in the first HARQ-ACK subcodebook is less than a number of bits of feedback information corresponding to each control information in the second HARQ-ACK subcodebook.

16. The method of claim 14, wherein under a condition that the first control information schedules a transmission of a physical channel and the physical channel corresponds to a Code Block Group (CBG) feedback, feedback information corresponding to the first control information is carried in the second HARQ-ACK subcodebook, and the feedback information corresponding to the first control information comprises HARQ-ACK information of a CBG-based feedback corresponding to the transmission of the physical channel.

17. The method of claim 14, wherein the second HARQ-ACK subcodebook is further used to carry feedback information corresponding to a first-type of control information, and the first type of control information comprises at least one of:

control information of a first control information format on a second cell, wherein the control information of the first control information format on the second cell schedules a transmission of a physical channel and the physical channel corresponds to a CBG feedback;

control information of the first control information format on the second cell, wherein a number of bits of feedback information corresponding to the control information of the first control information format on the second cell is greater than the number of bits of feedback information corresponding to each control information in the first HARQ-ACK subcodebook; or control information of the first control information format, wherein the control information of the first control information format is used to activate one or more physical channel transmissions in a semi-persistent scheduling, and a maximum number of the activated physical channel transmissions in the semi-persistent scheduling with a semi-persistent transmission period is not less than 2.

18. The method of claim 14, wherein the first feedback resource comprises a physical shared channel resource, the first feedback resource is scheduled by second control information, the second control information comprises a first uplink Downlink Assignment Index (DAI) field and a second uplink DAI field under a condition that the first device is configured to use a CBG transmission and/or a CBG feedback on at least one cell, the first uplink DAI field is used to determine a number of bits of feedback information included in the first HARQ-ACK subcodebook, and the second uplink DAI field is used to determine a number of bits of feedback information included in the second HARQ-ACK subcodebook.

19. The method of claim 14, wherein the HARQ-ACK codebook is used to carry feedback information corresponding to at least one of the following control information:

the first control information, wherein the first control information schedules a plurality of physical channel transmissions; or schedules a transmission of a physical channel and the physical channel corresponds to a CBG feedback; or schedules a transmission of a physical channel and the physical channel corresponds to a TB feedback;

control information of a first control information format on a second cell, wherein the control information of the first control information format on the second cell schedules a transmission of a physical channel and the physical channel corresponds to a CBG feedback;

control information of a second control information format, wherein the control information of the second control information format schedules a transmission of a physical channel and the physical channel corresponds to a TB feedback;

control information of a first control information format on a third cell, wherein the control information of the first control information format on the third cell schedules a transmission of a physical channel and the physical channel corresponds to a TB feedback;

control information of the second control information format, wherein the control information of the second control information format is used to activate one or more physical channel transmissions in a semi-persistent scheduling;

control information of the first control information format, wherein the control information of the first control information format is used to activate one or more physical channel transmissions in the semi-persistent scheduling, and a maximum number of the activated physical channel transmissions in the semi-persistent scheduling within a semi-persistent transmission period is 1;

control information for releasing physical channel transmissions in the semi-persistent scheduling;

control information for indicating a Secondary Cell (SCell) dormancy of a SCell.

20. A terminal device, comprising a transceiver; wherein the transceiver is configured to receive first control information from a second device, the first control information schedules at least one physical channel transmission, the first control information corresponds to a first control information format on a first cell, a maximum number of physical channel transmissions scheduled by the first control information format on the first cell is not less than 2, the at least one physical channel transmission corresponds to a Hybrid Automatic Repeat Request-Acknowledgement (HARQ-ACK) codebook, and the HARQ-ACK codebook corresponds to a first feedback resource;

the transceiver is further configured to send the HARQ-ACK codebook on the first feedback resource;

wherein the transceiver is further configured to send a first HARQ-ACK subcodebook and a second HARQ-ACK subcodebook that are cascaded on the first feedback resource;

wherein the first HARQ-ACK subcodebook is used to carry feedback information corresponding to control information that is not associated with physical channel transmissions and is required to send feedback information.

* * * * *